United States Patent
Arisawa et al.

(10) Patent No.: US 7,548,443 B2
(45) Date of Patent: Jun. 16, 2009

(54) THREE-PHASE PWM-SIGNAL GENERATING APPARATUS

(75) Inventors: Koichi Arisawa, Tokyo (JP); Kazunori Sakanobe, Tokyo (JP); Yosuke Shinomoto, Tokyo (JP); Masaaki Yabe, Tokyo (JP)

(73) Assignee: Mitsubishi Denki Kabushiki Kaisha, Chiyoda-ku, Tokyo (JP)

( * ) Notice: Subject to any disclaimer, the term of this patent is extended or adjusted under 35 U.S.C. 154(b) by 389 days.

(21) Appl. No.: 10/580,849

(22) PCT Filed: Aug. 10, 2005

(86) PCT No.: PCT/JP2005/014658

§ 371 (c)(1), (2), (4) Date: May 26, 2006

(87) PCT Pub. No.: WO2006/022142

PCT Pub. Date: Mar. 2, 2006

(65) Prior Publication Data

US 2007/0103950 A1  May 10, 2007

(30) Foreign Application Priority Data

Aug. 27, 2004  (JP) ............................. 2004-248891

(51) Int. Cl.
*H02M 7/5387* (2007.01)
(52) U.S. Cl. ........................................ 363/132; 363/41
(58) Field of Classification Search .................. 363/41, 363/97, 98, 131, 132
See application file for complete search history.

(56) References Cited

U.S. PATENT DOCUMENTS

| 5,214,575 | A | * | 5/1993 | Sugishima et al. | ............ 363/37 |
| 5,552,977 | A | * | 9/1996 | Xu et al. | ........................ 363/41 |
| 5,657,217 | A | * | 8/1997 | Watanabe et al. | ............. 363/71 |
| 7,102,327 | B2 | * | 9/2006 | Ho | ............................... 363/98 |

FOREIGN PATENT DOCUMENTS

| EP | 1 659 680 A1 | 5/2006 |
| JP | 07-143799 | 6/1995 |
| JP | 2002-95263 A | 3/2002 |
| JP | 2003-134845 | 5/2003 |
| JP | 2003-209976 A | 7/2003 |

(Continued)

OTHER PUBLICATIONS

Prasad et al., "Analysis and Comparison of Space Vector Modulation Schemes for a Four-Leg Voltage Source Inverter," *Applied Power Electronics Conference and Exposition, 1997, APEC '97 Conference Proceedings 1997*, Twelfth Annual, Atlanta, GA, vol. 2, pp. 864-871.

(Continued)

*Primary Examiner*—Jessica Han
(74) *Attorney, Agent, or Firm*—Buchanan Ingersoll & Rooney PC

(57) ABSTRACT

An apparatus for generating a three-phase pulse-width-modulation signal for a three-phase voltage inverter employing a semiconductor switching element includes a generating unit that generates the three-phase pulse-width-modulation signal based on at least one combination of three basic voltage vectors and at least a zero vector.

20 Claims, 25 Drawing Sheets

FOREIGN PATENT DOCUMENTS

| | | |
|---|---|---|
| JP | 3447366 B2 | 7/2003 |
| JP | 2003-224982 A | 8/2003 |
| WO | WO 03/105329 A1 | 12/2003 |

OTHER PUBLICATIONS

Blaabjerg et al., "Single Current Sensor Technique in the DC-link of Three-phase PWM-VS Inverters A Review and the Ultimate Solution," *Industry Applications Conference, 1996, Thirty-First IAS Annual Meeting, IAS '96, Conference Record of the 1996 IEEE*, San Diego, CA, vol. 2, pp. 1192-1202.

Extended European Search Report in connection with the corresponding European Application.

\* cited by examiner

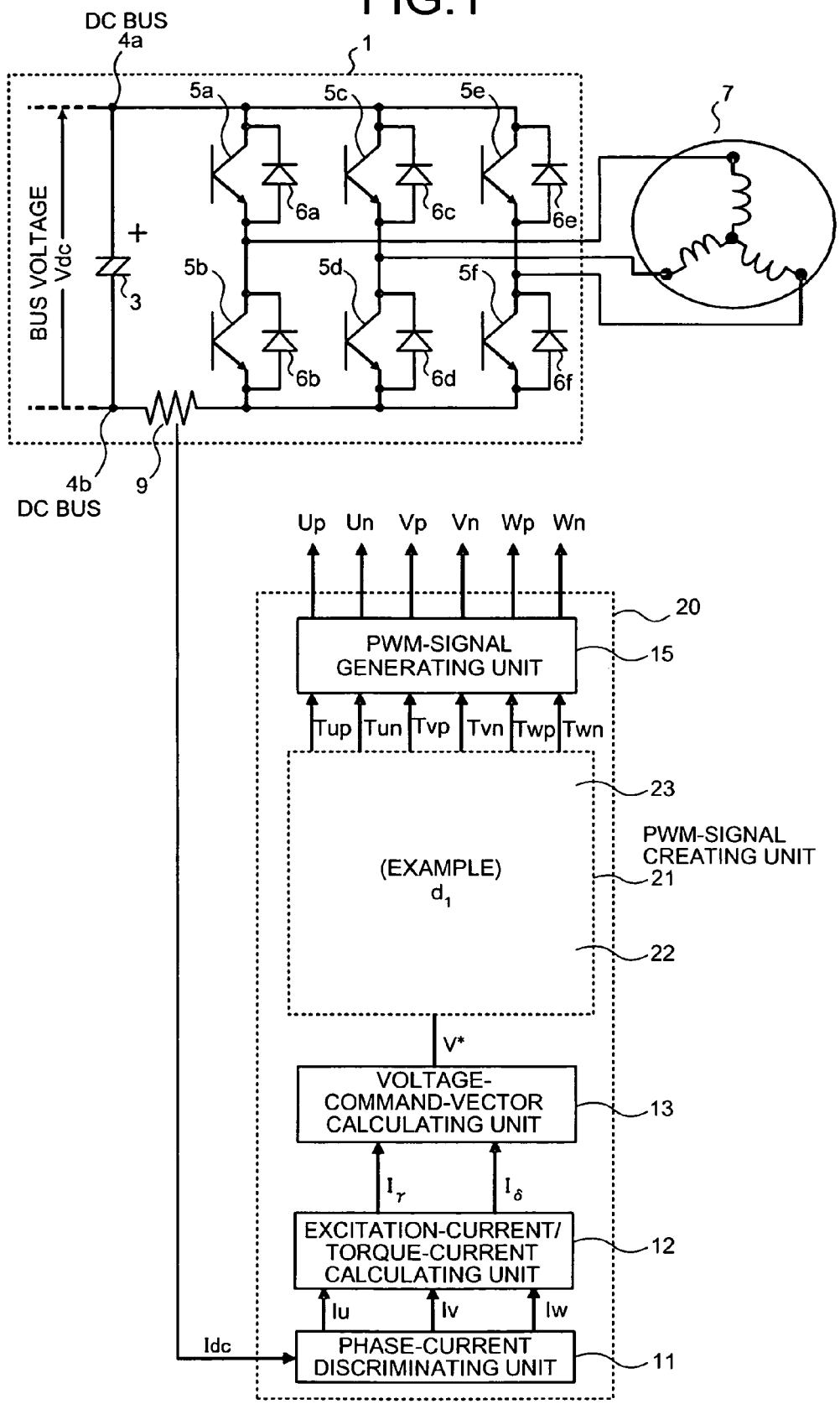

| INVERTER ROTATION ANGLE | PATTERN |
|---|---|
| 0° ≦ θ ≦ 30° | #6 |
| 30° ≦ θ ≦ 90° | #1 |
| 90° ≦ θ ≦ 150° | #2 |
| 150° ≦ θ ≦ 210° | #3 |
| 210° ≦ θ ≦ 270° | #4 |
| 270° ≦ θ ≦ 330° | #5 |
| 330° ≦ θ ≦ 360° | #6 |

FIG.16A
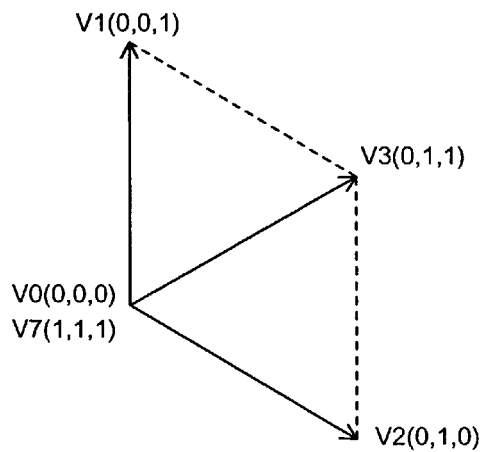
FIG.16B
(a) V7 ⇨ V3 ⇨ V1 ⇨ V0 ⇨ V2
(b) V7 ⇨ V3 ⇨ V1 ⇨ V0 ⇨ V2 ⇨ V3
(c) V7 ⇨ V3 ⇨ V2 ⇨ V0 ⇨ V1
(d) V7 ⇨ V3 ⇨ V2 ⇨ V0 ⇨ V1 ⇨ V3
FIG.17A
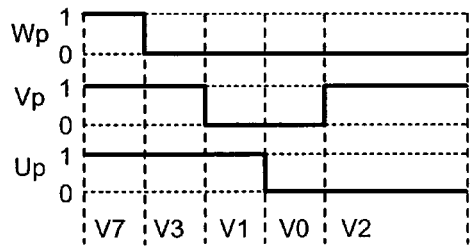
FIG.17B
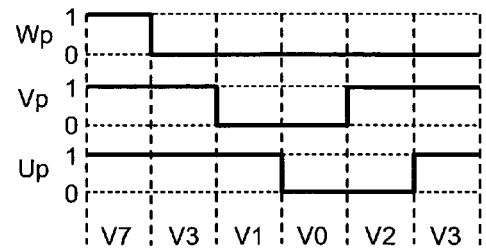
FIG.17C
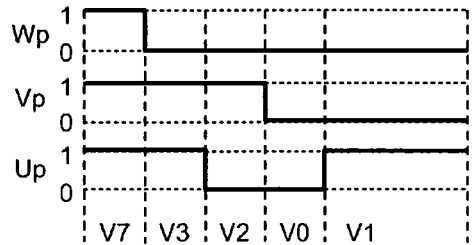
FIG.17D
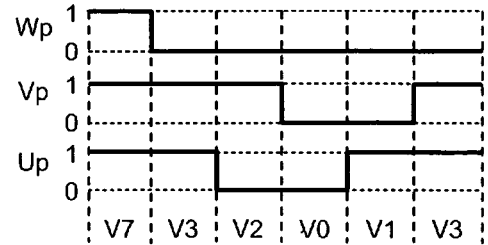

FIG.18A
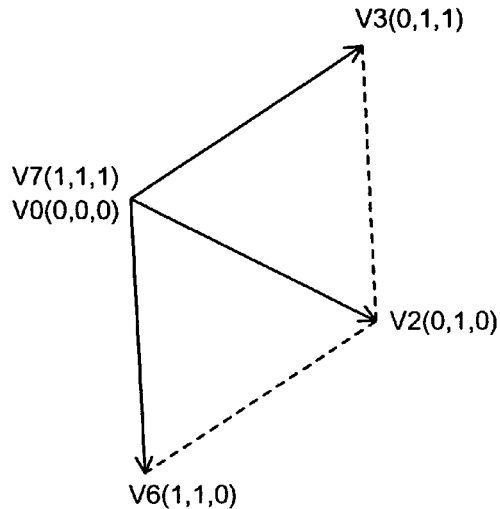
FIG.18B
(a) V7 ⇨ V3 ⇨ V0 ⇨ V2 ⇨ V6
(b) V7 ⇨ V3 ⇨ V2 ⇨ V0 ⇨ V2 ⇨ V6
(c) V7 ⇨ V6 ⇨ V0 ⇨ V2 ⇨ V3
(d) V7 ⇨ V6 ⇨ V2 ⇨ V0 ⇨ V2 ⇨ V3
FIG.19A
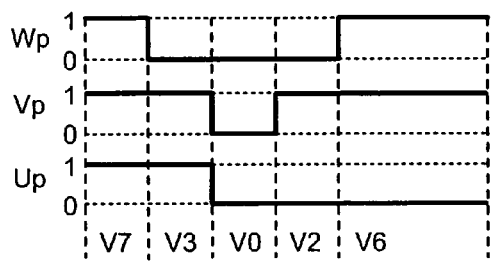
FIG.19B
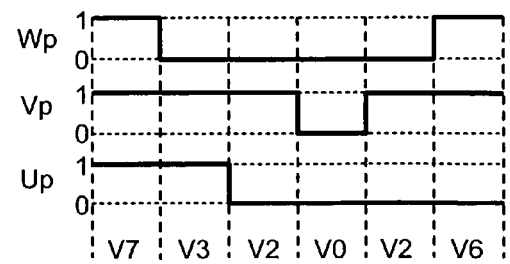
FIG.19C
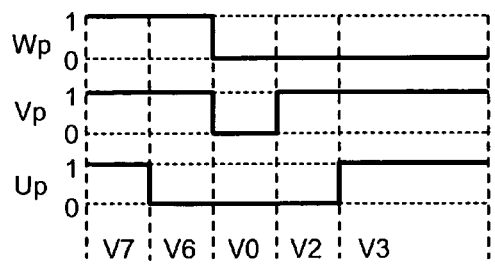
FIG.19D
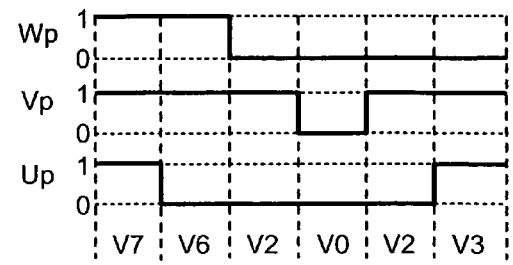

FIG.20A
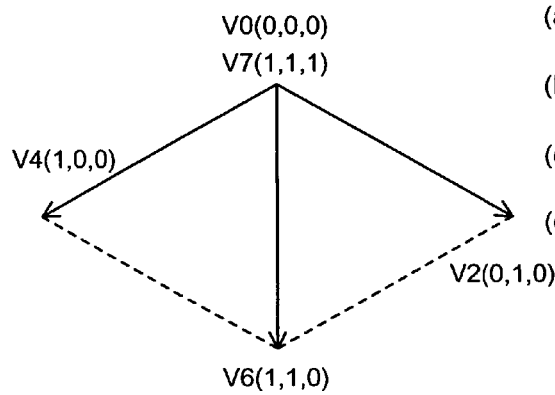
FIG.20B
(a) V7 ⇨ V6 ⇨ V2 ⇨ V0 ⇨ V4
(b) V7 ⇨ V6 ⇨ V2 ⇨ V0 ⇨ V4 ⇨ V6
(c) V7 ⇨ V6 ⇨ V4 ⇨ V0 ⇨ V2
(d) V7 ⇨ V6 ⇨ V4 ⇨ V0 ⇨ V2 ⇨ V6
FIG.21A
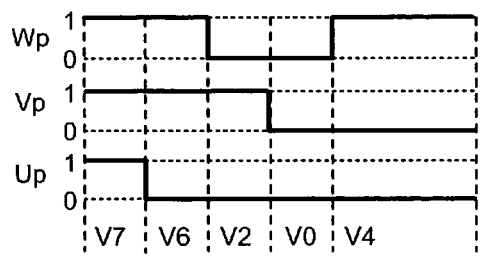
FIG.21B
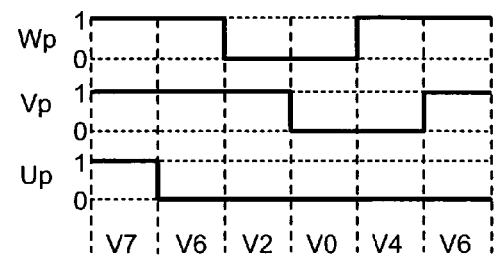
FIG.21C
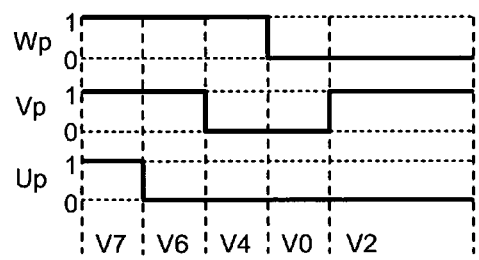
FIG.21D
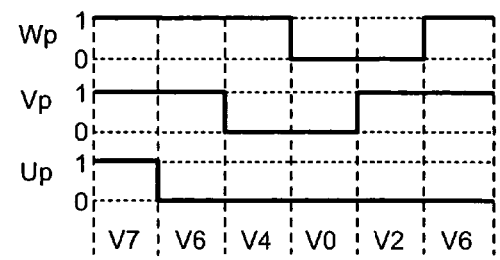

FIG.22A
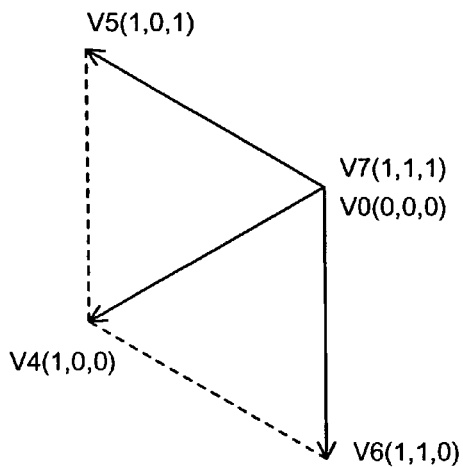
V5(1,0,1)
V7(1,1,1)
V0(0,0,0)
V4(1,0,0)
V6(1,1,0)
FIG.22B
(a) V7 ⇨ V6 ⇨ V0 ⇨ V4 ⇨ V5
(b) V7 ⇨ V6 ⇨ V4 ⇨ V0 ⇨ V4 ⇨ V5
(c) V7 ⇨ V5 ⇨ V0 ⇨ V4 ⇨ V6
(d) V7 ⇨ V5 ⇨ V4 ⇨ V0 ⇨ V4 ⇨ V6
FIG.23A
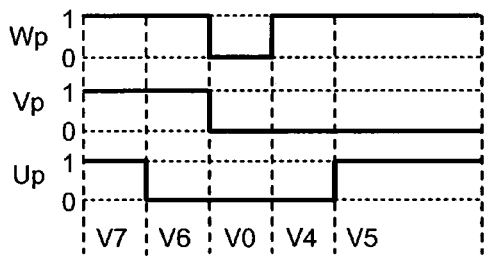
FIG.23B
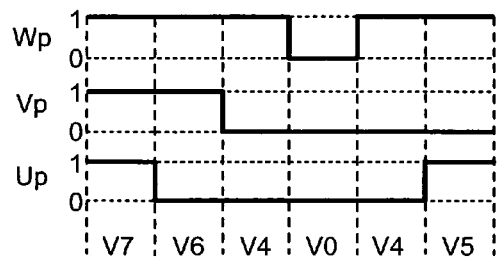
FIG.23C
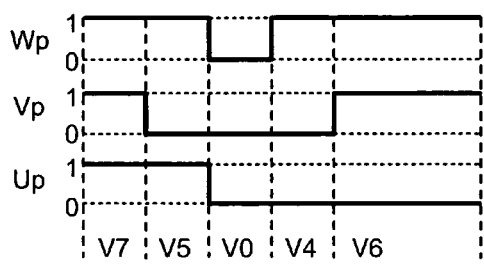
FIG.23D
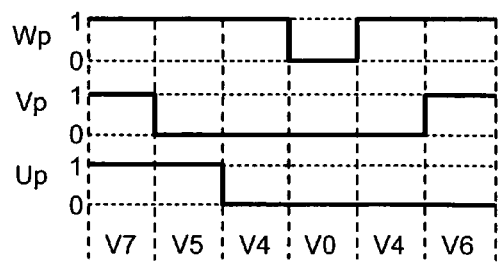

FIG.24A
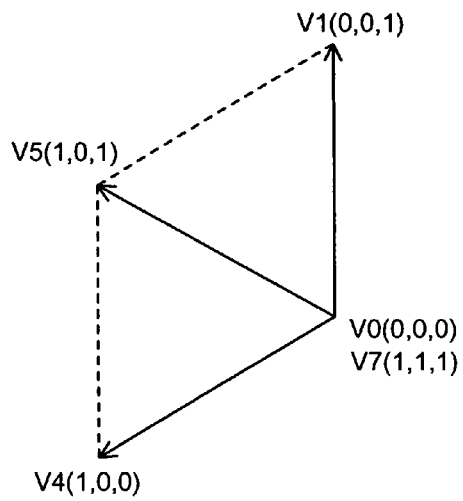
FIG.24B
(a) V7 ⇨ V5 ⇨ V4 ⇨ V0 ⇨ V1
(b) V7 ⇨ V5 ⇨ V4 ⇨ V0 ⇨ V1 ⇨ V5
(c) V7 ⇨ V5 ⇨ V1 ⇨ V0 ⇨ V4
(d) V7 ⇨ V5 ⇨ V1 ⇨ V0 ⇨ V4 ⇨ V5
FIG.25A
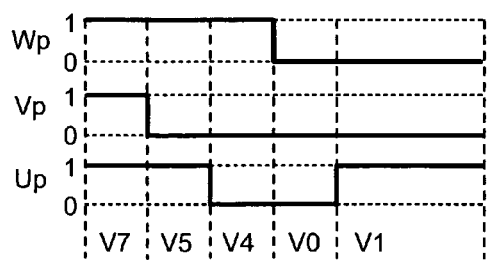
FIG.25B
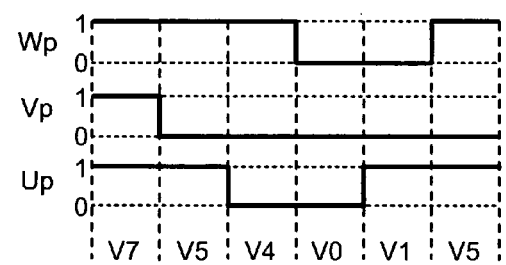
FIG.25C
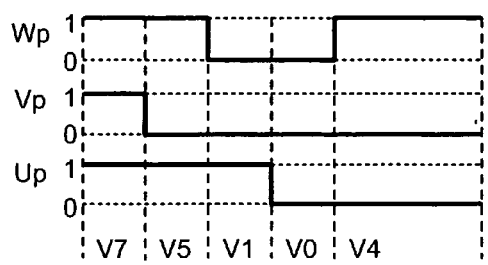
FIG.25D
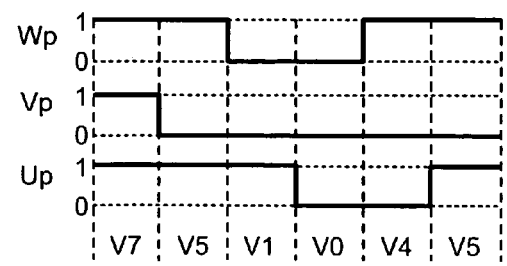

FIG.26A
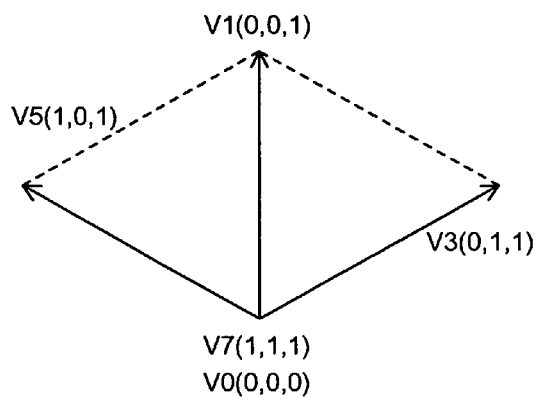
V1(0,0,1)
V5(1,0,1)
V3(0,1,1)
V7(1,1,1)
V0(0,0,0)
FIG.26B
(a) V7 ⇨ V5 ⇨ V0 ⇨ V1 ⇨ V3
(b) V7 ⇨ V5 ⇨ V1 ⇨ V0 ⇨ V1 ⇨ V3
(c) V7 ⇨ V3 ⇨ V0 ⇨ V1 ⇨ V5
(d) V7 ⇨ V3 ⇨ V1 ⇨ V0 ⇨ V1 ⇨ V5
FIG.27A
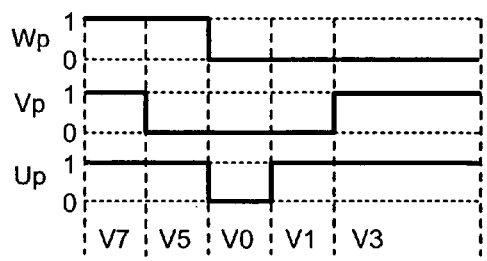
FIG.27B
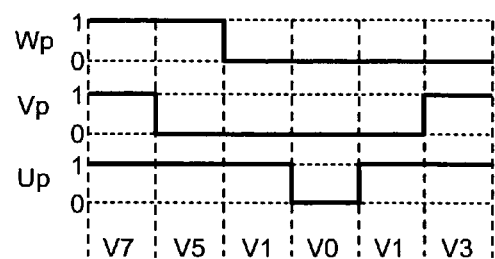
FIG.27C
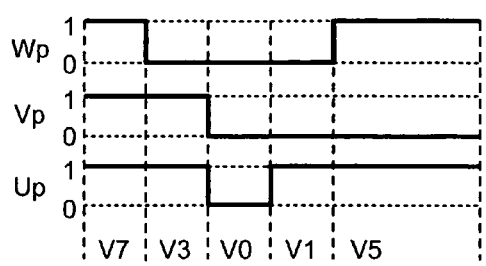
FIG.27D
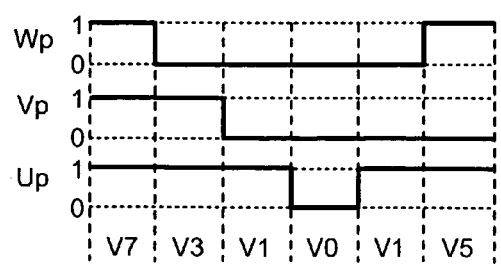

FIG.31A
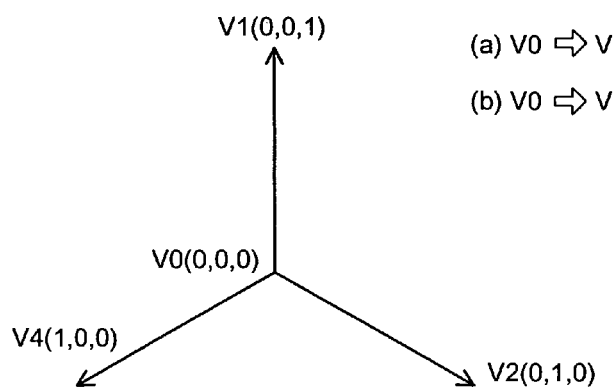
FIG.31B
(a) V0 ⇨ V1 ⇨ V0 ⇨ V2 ⇨ V0 ⇨ V4
(b) V0 ⇨ V1 ⇨ V0 ⇨ V4 ⇨ V0 ⇨ V2
FIG.32A
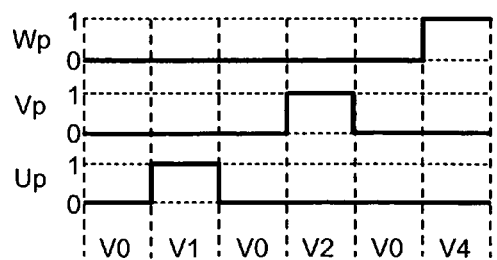
FIG.32B
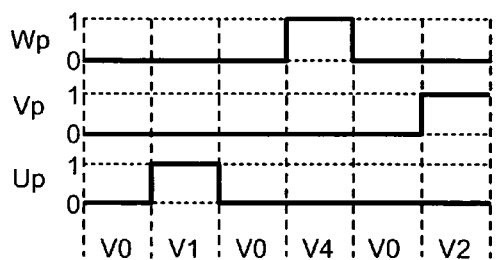

FIG.33A
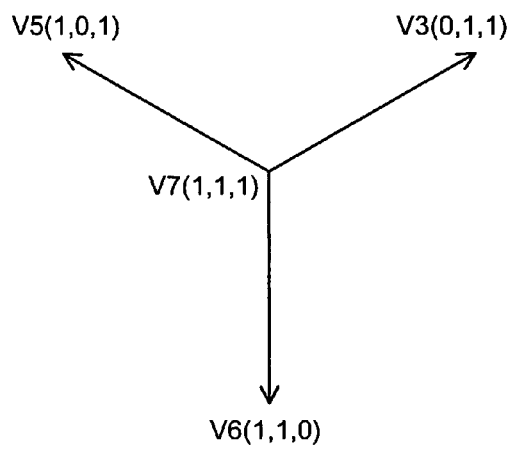
FIG.33B
(a) V7 ⇨ V3 ⇨ V7 ⇨ V6 ⇨ V7 ⇨ V5
(b) V7 ⇨ V3 ⇨ V7 ⇨ V5 ⇨ V7 ⇨ V6
FIG.34A
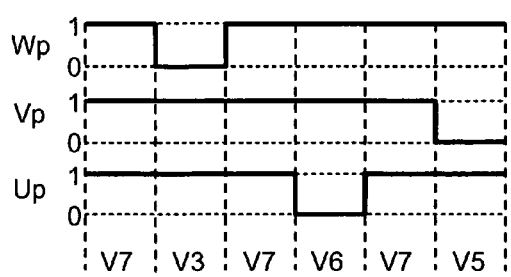
FIG.34B
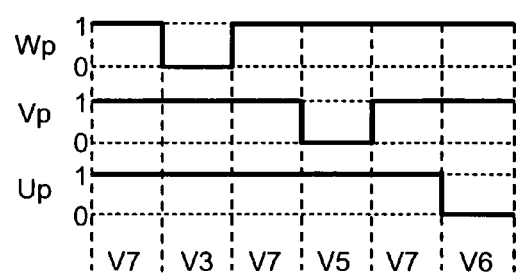

WHEN MODULATION METHOD IS SWITCHED ACCORDING TO FREQUENCY

WHEN MODULATION METHOD IS SWITCHED ACCORDING TO LOAD TORQUE

WHEN MODULATION METHOD IS SWITCHED ACCORDING TO ELECTRICAL ANGLE

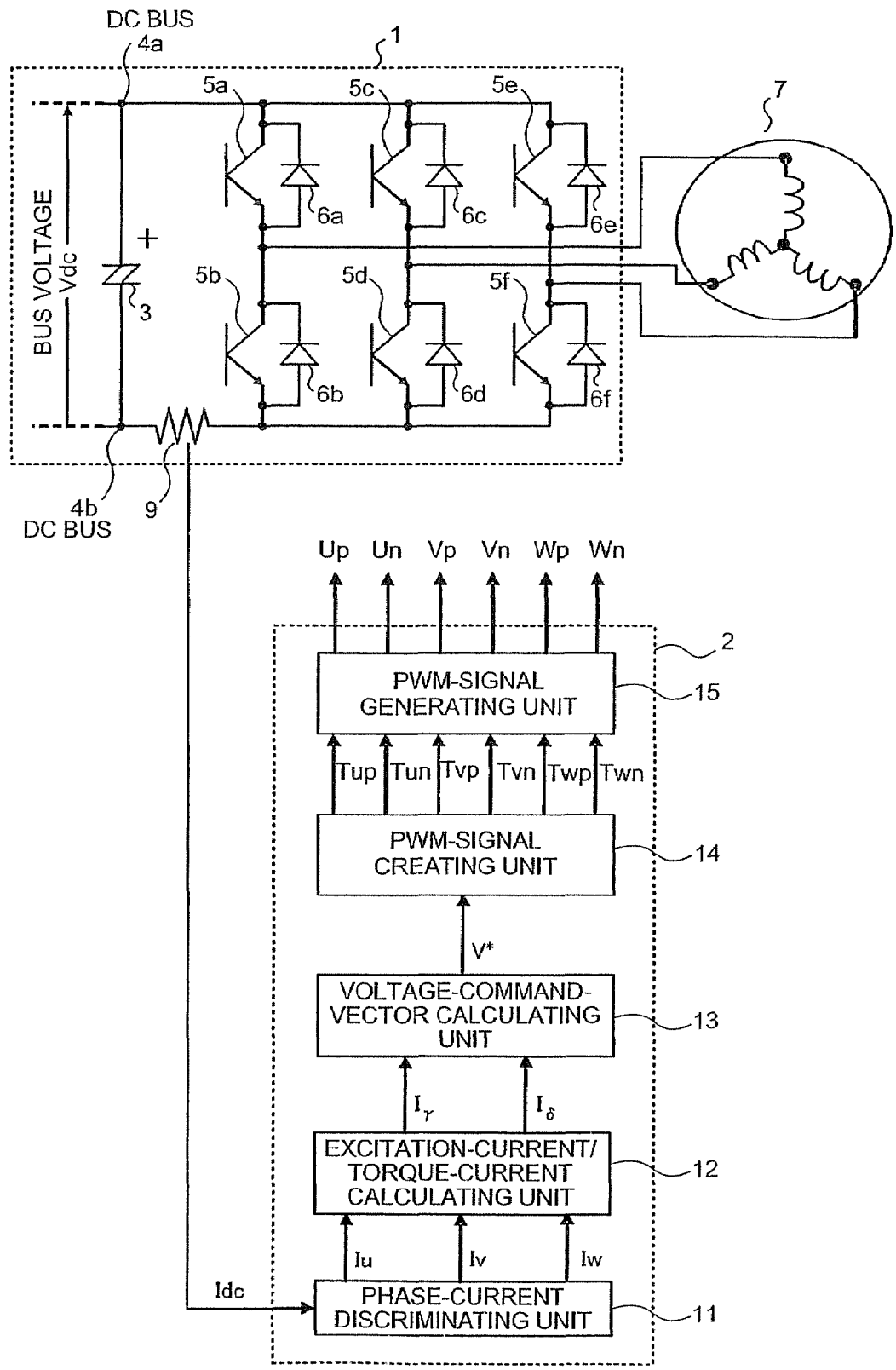
CONVENTIONAL
FIG.36

CONVENTIONAL FIG.37
| BASIC VOLTAGE VECTOR | Wp (W-PHASE POSITIVE SIDE SWITCHING ELEMENT LOGICAL STATE) | Vp (V-PHASE POSITIVE SIDE SWITCHING ELEMENT LOGICAL STATE) | Up (U-PHASE POSITIVE SIDE SWITCHING ELEMENT LOGICAL STATE) | OBSERVABLE PHASE CURRENT |
|---|---|---|---|---|
| V0 | 0 | 0 | 0 | OBSERVATION IMPOSSIBLE |
| V1 | 0 | 0 | 1 | Iu |
| V2 | 0 | 1 | 0 | Iv |
| V3 | 0 | 1 | 1 | -Iw |
| V4 | 1 | 0 | 0 | Iw |
| V5 | 1 | 0 | 1 | -Iv |
| V6 | 1 | 1 | 0 | -Iu |
| V7 | 1 | 1 | 1 | OBSERVATION IMPOSSIBLE |
CONVENTIONAL FIG.38
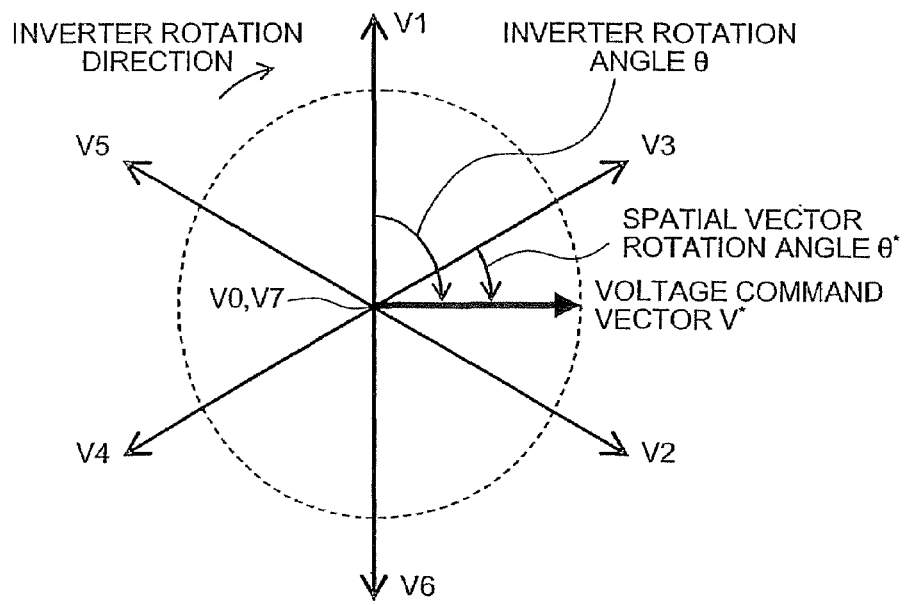

FIG.39A
CONVENTIONAL
FIG.39B
CONVENTIONAL
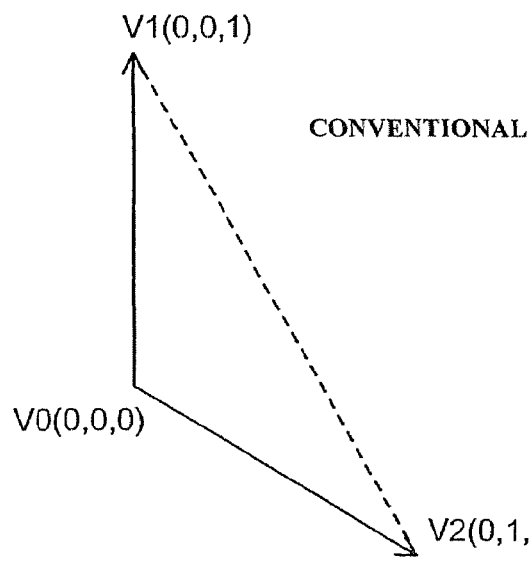
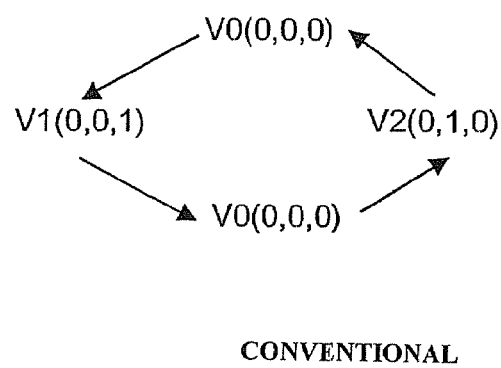
FIG.40
CONVENTIONAL
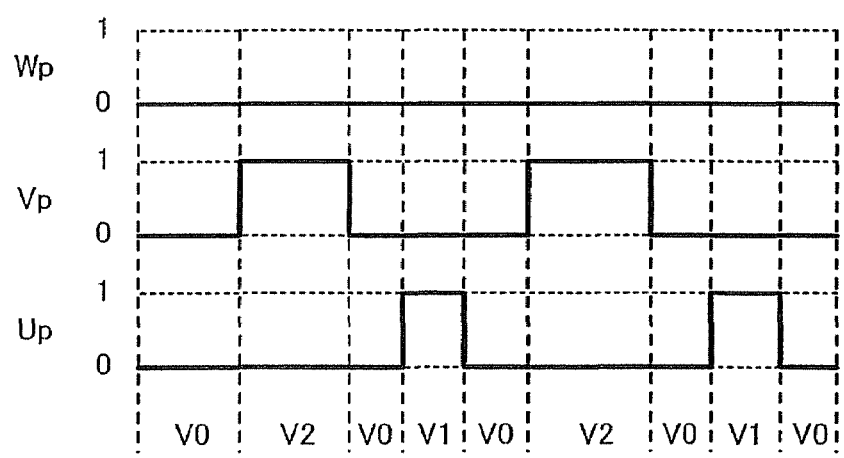

FIG.41A
CONVENTIONAL
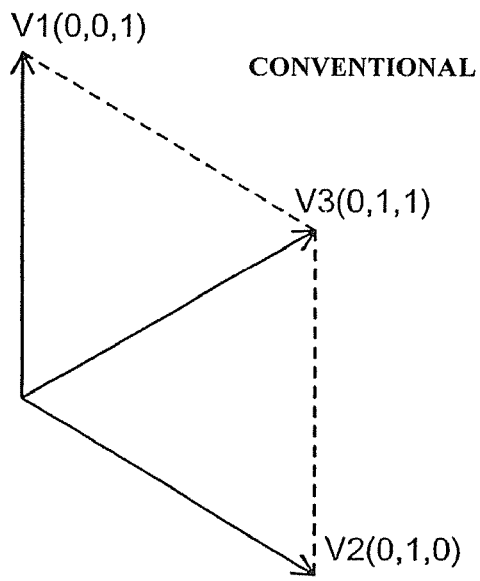
FIG.41B
CONVENTIONAL
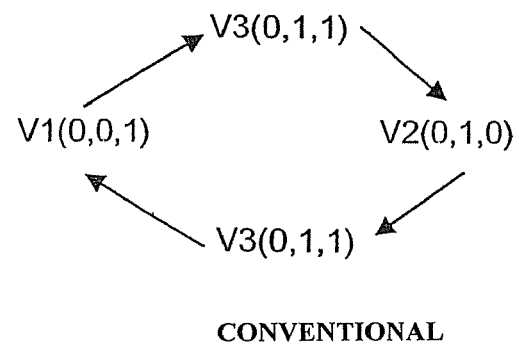
FIG.42   CONVENTIONAL
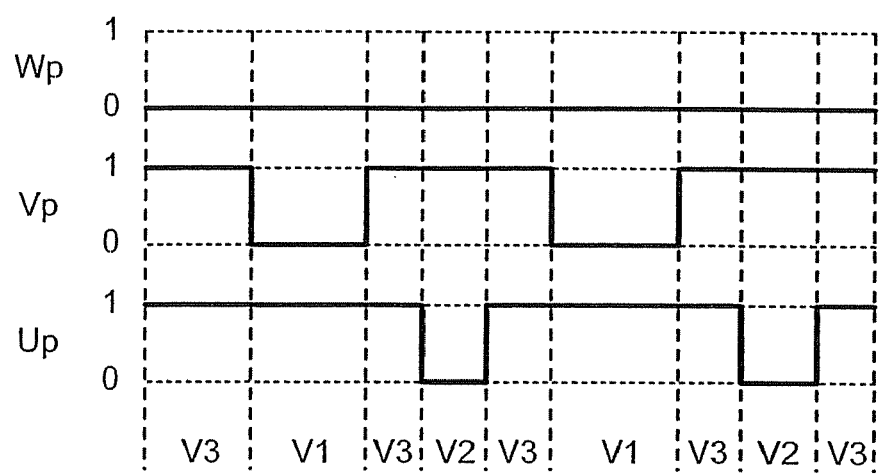

7,548,443 B2

THREE-PHASE PWM-SIGNAL GENERATING APPARATUS

TECHNICAL FIELD

The present invention relates to a three-phase pulse-width-modulation (PWM)-signal generating apparatus that generates a three-phase PWM signal for defining a switching mode set by a semiconductor switching element in a three-phase voltage inverter.

BACKGROUND ART

A three-phase voltage inverter is used for an inverter for, for example, an inverter for controlling to drive a motor of a refrigeration air conditioning apparatus. To facilitate understanding of the present invention, a constitution and an operation of a conventional inverter are explained below with reference to FIGS. 36 to 42.

FIG. 36 is a block diagram of an example of the conventional inverter. The conventional inverter shown in FIG. 36 includes an inverter main circuit 1 and an inverter control unit 2 that generates a three-phase PWM signal that is a drive signal for a semiconductor switching element included in the inverter main circuit 1. In other words, the present invention relates to an improvement of the inverter control unit 2.

The inverter main circuit 1 is a well-known circuit including a DC power supply 3 that gives a bus voltage Vdc, three sets of semiconductor switching elements (5a, 5b), (5c, 5d), and (5e, 5f) that are connected in series between a DC bus 4a connected to a positive pole of the DC power supply 3 and a DC bus 4b connected to a negative pole of the DC power supply 3, and flywheel diodes 6a to 6f that are connected in series to the respective semiconductor switching elements. A motor 7 is connected to respective DC connection terminals of the three sets of semiconductor switching elements (5a, 5b), (5c, 5d), and (5e, 5f).

A DC current detecting unit 9, which detects a DC bus current Idc used in the inverter control unit 2, is provided in, for example, the DC bus 4b. The DC current detecting unit 9 includes a detection element (a resistor, a current transformer, etc.) inserted in the DC bus 4b and an amplifier that amplifies a both-end voltage of the detection element (the resistor) or an output voltage of the detection element (the current transformer). The DC current detecting unit 9 converts an output voltage of this amplifier into an electric current to obtain a DC bus current Idc.

The inverter control unit 2 includes a phase-current discriminating unit 11 that discriminates phase currents Iu, Iv, and Iw from the DC bus current Idc inputted from the DC current detecting unit 9, a unit 12 that calculates an excitation current and a torque current for calculating an excitation current Iγ (a γ axis current) and a torque current Iδ (a δ axis current) from the phase currents Iu, Iv, and Iw, a voltage-command-vector calculating unit 13 that calculates a voltage command vector V* used in the next control from the excitation current Iγ and the torque current Iδ, a PWM-signal creating unit 14 that produces conducting time signals Tup, Tun, Tvp, Tvn, Twp, and Twn, which are three-phase PWM signals during one carrier period, from the voltage command vector V*, and a PWM-signal generating unit 15 that generates driving signals Up, Un, Vp, Vn, Wp, and Wn, which are three-phase PWM signals applied to the semiconductor switching elements 5a to 5f, from the conducting time signals Tup, Tun, Tvp, Tvn, Twp, and Twn. Note that a subscript "p" means a positive pole side and a subscript "n" means a negative pole side.

An operation of the inverter control unit 2 is explained. Among the semiconductor switching elements 5a to 5f of the inverter main circuit 1, the semiconductor switching elements 5a, 5c, and 5e connected to the DC bus 4a on the positive pole side perform an ON operation or the semiconductor switching elements 5b, 5d, and 5f connected to the DC bus 4b on the negative pole side perform an ON operation. Since there are the semiconductor switching elements for three phases, eight ($2^3$=8) kinds of switching patterns or switching modes are present in total. These are states of output to the motor 7.

As state representation of the semiconductor switching elements, an ON operation state of the semiconductor switching elements is represented as a logical value 1 and an OFF operation state of the semiconductor switching elements is represented as a logical value 0. Eight kinds of states of output to the motor 7 are associated with eight kinds of voltage vectors (basic voltage vectors) of V0 to V7 as described below. Among these eight kinds of voltage vectors, V1 to V6 are voltage vectors corresponding to six switching modes having vector lengths and the remaining V0 and V7 are voltage vectors corresponding to two switching modes not having vector lengths. The voltage vectors V0 and V7 are specifically referred to as "zero vectors". The voltage vectors V1 to V6 are often referred to as "basic voltage vectors" to be distinguished from the "zero vectors".

A correspondence relation among the voltage vectors V1 to V6 is represented by logical states of the switching elements connected to the DC bus 4a, namely, a logical state of W-phase positive pole side switching elements, a logical state of V-phase positive pole side switching elements, and a logical state of U-phase positive pole side switching elements. The logical states (0, 0, 1) correspond to the voltage vector V1, the logical states (0, 1, 0) correspond to the voltage vector V2, the logical states (0, 1, 1) correspond to the voltage vector V3, the logical states (1, 0, 0) correspond to the voltage vector V4, the logical states (1, 0, 1) correspond to the voltage vector V5, and the logical states (1, 1, 0) correspond to the voltage vector V6.

A correspondence relation between the two zero vectors V0 and V7 is represented by logical states of the switching elements connected to the DC bus 4a, namely, a logical state of W-phase positive pole side switching elements, a logical state of V-phase positive pole side switching elements, and a logical state of U-phase positive pole side switching elements. The logical state (0, 0, 0) corresponds to the zero vector V0 and the logical state (1, 1, 1) corresponds to the zero vector V7.

While the six voltage vectors V1 to V6 are produced, an electric current flowing to a winding of the motor 7 flows to the DC buses 4a and 4b. Thus, it is possible to detect the electric current with the DC current detecting unit 9 and observe the electric current as the DC bus current Idc. On the other hand, while the zero vectors V0 and V7 are produced, it is impossible to observe the electric current as the DC bus current Idc.

FIG. 37 is a table of a relation between eight kinds of basic voltage vectors, switching modes corresponding to the basic voltage vectors, and phase currents that can be observed as a DC bus current Idc. As shown in FIG. 37, it is impossible to observe a phase current in the zero vectors V0 and V7. However, a phase current is observed as "Iu (U-phase current)" in the voltage vector V1, observed as "Iv (V-phase current)" in the voltage vector V2, observed as "−Iw (W-phase current)" in the voltage vector V3, observed as "Iw" in the voltage vector V4, observed as "−Iv" in the voltage vector V5, and observed as "−Iu" in the voltage vector V6.

To rotate the motor 7 smoothly, it is necessary to obtain a magnetic flux corresponding to a desired voltage and a desired frequency. This can be realized by combining the eight kinds of voltage vectors appropriately. FIG. 38 is a diagram for explaining a phase relation between the basic voltage vectors and a relation between the inverter rotation angle and a voltage command vector. In FIG. 38, when an inverter rotation direction is clockwise, the six voltage vectors V1 to V6 are arranged on a phase plane in an order of V1, V3, V2, V6, V4, and V5 clockwise at a phase difference of 60 degrees. The two zero vectors V0 and V7 are shown in an origin position.

In FIG. 38, an inverter rotation angle θ having a direction of the voltage vector V1 (U-phase) as an initial phase gives a phase of a voltage command vector V*. A phase angle between one of the six voltage vectors, which are produced in the inverter rotation direction, and the voltage command vector V* is referred to as a spatial vector rotation angle θ*. Note that an angle range of the spatial vector rotation angle θ* is 0 degree≦θ*<60 degrees.

Production ratios of the respective voltage vectors depend on a percentage modulation that is a ratio of an output voltage to a bus voltage. Production times of the respective voltage vectors depend on the voltage command vector V* and the spatial vector rotation angle θ*. Thus, the phase-current discriminating unit 11 calculates the phase currents Iu, Iv, and Iw from the DC bus current Idc in accordance with the table shown in FIG. 37 while the respective voltage vectors are produced.

Subsequently, the unit 12 for calculating an excitation current and a torque current converts the phase currents Iu, Iv, and Iw calculated by the phase-current discriminating unit 11 into an excitation current Iγ (a γ axis current) and a torque current Iδ (a δ axis current) using, for example, a three-phase to two-phase conversion matrix [C$_1$] indicated by Equation (1) and a rotation matrix [C$_2$] indicated by Equation (2). Note that, in Equation (2), θ indicates an inverter rotation angle, and a rotation direction is clockwise.

$$[C_1] = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \quad (1)$$

$$[C_2] = \begin{bmatrix} \cos\theta & \sin\theta \\ -\sin\theta & \cos\theta \end{bmatrix} \quad (2)$$

A coordinate system, on which the unit 12 for calculating an excitation current and a torque current is based, is a γ-δ axis rather than a d-q axis. This point is explained below. An N pole side on a rotor of the motor 7 is set as a d axis and a phase advanced 90 degrees (an electrical angle) in a rotation direction is set as a q axis. When a sensor for detecting a rotor position like a pulse encoder is not used for driving of a synchronous motor, the inverter control unit 2 cannot grasp a d-q axis coordinate of the rotor accurately. Actually, the inverter control unit 2 performs control with a coordinate system shifted by a phase difference Δθ from the d-q axis coordinate system. This coordinate system shifted by the phase difference Δθ is generally referred to as a γ-δ axis coordinate. It is a practice to use this γ-δ axis coordinate. This also applies in this specification.

The voltage-command-vector calculating unit 13 performs various kinds of vector control operation including speed control based on the excitation current Iγ (the γ axis current) and the torque current Iδ (the δ axis current) calculated by the unit 12 for calculating an excitation current and a torque current. The voltage-command-vector calculating unit 13 calculates a magnitude and a phase of the voltage command vector V* used for the next control. This phase angle is the inverter rotation angle θ as described above.

The PWM-signal creating unit 14 produces conducting time signals Tup, Tun, Tvp, Tvn, Twp, and Twn based on the voltage command vector V* according to various systems described later. Consequently, the PWM-signal generating unit 15 generates three-phase PWM signals Up, Un, Vp, Vn, Wp, Wn, which are driving signals applied to the semiconductor switching elements 5a to 5f, from the conducting time signals Tup, Tun, Tvp, Tvn, Twp, and Twn and controls the semiconductor switching elements 5a to 5f. As a result, the motor 7 is driven.

As a system for generating a PWM signal in the PWM-signal creating unit 14, conventionally, two systems have been mainly used. One system is a system for generating a PWM signal using four kinds of basic voltage vectors in total, namely, two kinds of basic voltage vectors with a phase difference of 60 degrees and two kinds of zero vectors not having a magnitude that are obtained by switching only one phase of switching states of the two kinds of basic voltage vectors (hereinafter referred to as "three-phase modulation system"). The other system is a system for generating a PWM signal using three kinds of basic voltage vectors in total, namely, two kinds of basic voltage vectors with a phase difference of 60 degrees and one of the two kinds of zero vectors not having a magnitude (hereinafter referred to as "two-phase modulation system").

Specifically, this is a method of, by decomposing the voltage command vector V* from the voltage-command-vector calculating unit 13 in directions of two basic voltage vectors corresponding thereto, generating production time ratios of the respective basic voltage vectors and calculating conducting times (or non-conducting times) of the respective semiconductor switching elements during one carrier period. This system has problems described below.

A ratio of an output voltage to a DC bus voltage is referred to as a percentage modulation. In the three-phase modulation system or the two-phase modulation system, when the percentage modulation is low, production time ratios of both the two kinds of basic voltage vectors having a magnitude and a phase difference of 60 degrees decreases and a holding time width of a switching mode is narrowed. Even if the percentage modulation is high to some extent, when the voltage command vector V* is close to one of the basic voltage vectors, a production time ratio of the other basic voltage vector distant from the voltage command vector V* decreases and a holding time width of a switching mode is narrowed.

In these two cases, there is a problem in that, in a production section of a basic voltage vector with a short holding time width of a switching mode, since a sufficient DC current detection time cannot be secured and current detection cannot be performed correctly, controllability is deteriorated significantly.

Thus, in recent years, to secure a holding time width of a switching mode in the cases described above, a system for generating a PWM signal with a switching pattern different from the three-phase system and the two-phase system (hereinafter referred to as "extended PWM system") has been proposed (e.g., patent document 1).

The patent document 1 discloses a three-phase PWM voltage generating circuit that generates a three-phase PWM voltage signal using three kinds of basic voltage vectors in total, namely, two kinds of basic voltage vectors with a phase difference of 120 degrees and a zero vector not having a magnitude that is obtained by switching only one phase of switching states of these basic voltage vectors. The patent document 1 also discloses a three-phase PWM voltage generating circuit that generates a three-phase PWM voltage signal using three-kinds of basic voltage vector having phase differences of 60 degrees, respectively.

In this extended PWM system, the conducting time signals Tup, Tun, Tvp, Tvn, Twp, and Twn are generated by two methods described below.

(1) As a switching mode during one carrier period, the conducting time signals Tup, Tun, Tvp, Tvn, Twp, and Twn are generated according to time ratio control for three kinds of vectors in total, namely, two kinds of basic voltage vectors with a phase difference of 120 degrees and a zero vector obtained by switching of only one phase from a switching state of one of the two kinds of basic voltage vectors (this is referred to as "first combination").

(2) As a switching mode during one carrier period, the conducting time signals Tup, Tun, Tvp, Tvn, Twp, and Twn are generated according to time ratio control for three kinds of basic voltage vectors having phase differences of 60 degrees, respectively (this is referred to as "second combination"). These methods are explained below with reference to FIGS. 39A to 42.

FIGS. 39A and 39B are diagrams of a relation between the basic voltage vectors used for a first combination in the PWM-signal creating unit shown in FIG. 36 on a phase plane and an example of an order of switching the basic voltage vectors, respectively. FIG. 40 is a timing chart of an example of a logical state (a switching pattern) of a semiconductor switching element on a DC-bus positive-pole side controlled by the first combination.

In the case of the first combination, for example, when an area in which the inverter rotation angle θ is 30 to 90 degrees is considered limitedly, it is possible to generate the conducting time signals Tup, Tun, Tvp, Tvn, Twp, and Twn by using the basic voltage vectors V1 (0, 0, 1) and V2 (0, 1, 0) with a phase difference of 120 degrees and the zero vector V0 (0, 0, 0) as shown in FIG. 39A and switching the vectors in an order of V0, V2, V0, V1, and V0 as shown in FIG. 39B. A logical state (a switching pattern) of the semiconductor switching elements 5a, 5c, and 5e on a DC bus positive pole side in this case is as shown in FIG. 40. It is seen that a state of output to the motor 7 by the driving signals Wp, Vp, and Up, which are given to the semiconductor switching elements 5a, 5c, and 5e by the PWM-signal generating unit 15, changes in the switching order shown in FIG. 39B.

FIGS. 41A and 41B are diagrams of a relation between the basic voltage vectors used for a second combination in the PWM-signal creating unit shown in FIG. 36 on a phase plane and an example of an order of switching the basic voltage vectors, respectively. FIG. 42 is a timing chart of an example of a logical state (a switching pattern) of a semiconductor switching element on a DC-bus positive-pole side controlled by the second combination.

In the case of the second combination, for example, when an area in which the inverter rotation angle θ is 30 to 90 degrees is considered limitedly, it is possible to generate the conducting time signals Tup, Tun, Tvp, Tvn, Twp, and Twn by using the basic voltage vectors V1 (0, 0, 1), V3 (0, 1, 1), and V2 (0, 1, 0) having phase differences of 60 degrees and switching the vectors in an order of V3, V1, V3, V2, and V3 as shown in FIG. 41B. A logical state (a switching pattern) of the semiconductor switching elements 5a, 5c, and 5e on a DC bus positive pole side in this case is as shown in FIG. 42. It is seen that a state of output to the motor 7 by driving the signals Wp, Vp, and Up, which are given to the semiconductor switching elements 5a, 5c, and 5e by the PWM-signal generating unit 15, changes in the switching order shown in FIG. 41B.

Note that, for example, a patent document 2 discloses a three-phase PWM voltage generating circuit that obtains a sufficient pulse width by contriving pulse width modulation when it is difficult to detect a DC bus voltage. A patent document 3 discloses an inverter or the like that makes it possible to detect an electric current by inserting a carrier wave for one period when it is necessary to detect a DC bus voltage. A patent document 4 discloses a PWM inverter or the like that makes it possible to detect an electric current by preparing a conversion table in advance and setting a pulse width of a DC bus current to a predetermined value or more. A patent document 5 discloses an inverter or the like that makes it possible to perform sampling of a DC bus current even in an inexpensive microcomputer by contriving detection timing of the DC bus current.

Patent Document 1: Japanese Patent Application Laid-open No. 7-298631

Patent Document 2: Japanese Patent No. 3447366

Patent Document 3: Japanese Patent Application Laid-open No. 2003-224982

Patent Document 4: Japanese Patent Application Laid-open No. 2003-209976

Patent Document 5: Japanese Patent Application Laid-open No. 2002-95263

DISCLOSURE OF INVENTION

Problem to be Solved by the Invention

However, the conventional extended PWM system has problems described below. In the system for generating a three-phase PWM signal using three kinds of basic voltage vectors in total, namely, two kinds of basic voltage vectors with a phase difference of 120 degrees and a zero vector not having a magnitude that is obtained by switching only one phase of switching states of the basic voltage vectors, there is a limitation on a magnitude of a conducting time signal to be generated. In other words, there is a limitation on a magnitude of a voltage command vector used for the next control that can be produced. The voltage command vector can only be applied to a range with a low percentage modulation. Thus, there is a significant limitation of use of the system.

In this system, since basic voltage vectors with a phase difference of 60 degrees is not used, inverter efficiency is deteriorated as a result of feeding an effective current more than necessary. There is a tendency that higher harmonics increases in a motor current and noise and vibration increase. In addition, in this system, there is also a problem in that, when a holding time width of a zero vector is narrowed, an area close to two-phase simultaneous switching is generated to make switching itself unstable.

On the other hand, in the system for generating a three-phase PWM signal using three kinds of basic voltage vectors having phase differences of 60 degrees, respectively, since a zero vector is not used, efficiency is deteriorated significantly. In this system, when a width of one basic voltage vector is narrowed, an area close to two-phase simultaneous switching is generated to make switching itself unstable. Thus, a limitation on a range of use of the system is large. In addition, in this system, practically, since there are many limitations of a percentage modulation or a spatial vector rotation angle, there is a problem in that burdens on software increase and, as a result, hardware with high performance is required.

The present invention has been devised in view of the circumstances described above and it is an object of the present invention to obtain a three-phase PWM-signal generating apparatus that can increase a holding time width of a switching mode with a simple method having a less limitation of an output voltage range and can reduce a current detection limited range of a DC bus without adding a new device in a three-phase voltage inverter.

Means for Solving Problem

An apparatus for generating a three-phase pulse-width-modulation signal for a three-phase voltage inverter employing a semiconductor switching element, according to one aspect of the present invention, includes a generating unit that generates the three-phase pulse-width-modulation signal based on a combination of three basic voltage vectors and a zero vector.

According to the present invention, it is possible to generate a PWM signal having a high degree of freedom of a percentage modulation and preventing excessive deterioration of efficiency with a simple method of using three kinds of basic voltage vectors and at least one kind of a zero vector without adding a special device.

Effect of the Invention

According to the present invention, there is an effect that it is possible to increase a holding time width of a switching mode with a simple method with a less limitation of an output voltage range without adding a new device and it is possible to generate a three-phase PWM signal in a form of reducing a current detection limited range of a DC bus.

BRIEF DESCRIPTION OF DRAWINGS

FIG. 1 is a block diagram of an inverter including a three-phase PWM-signal generating apparatus according to a first embodiment of the present invention;

FIGS. 16A and 16B are diagrams of a relation between three basic voltage vectors and two zero vectors on a phase plane when the inverter rotation angle is near 60 degrees in generating a PWM signal using the basic voltage vectors and the zero vectors according to a second embodiment of the present invention and an example of an order of switching the basic voltage vectors and the zero vectors, respectively;

FIGS. 17A to 17D are timing charts of logical states (switching patterns) of a semiconductor switching element on a DC-bus positive-pole side controlled by four ways of switching the basic voltage vectors and the zero vectors shown in FIG. 16B (pattern #21);

FIGS. 18A and 18B are diagrams of a relation between three basic voltage vectors and two zero vectors on a phase plane when the inverter rotation angle is near 120 degrees in generating a PWM signal using the basic voltage vectors and the zero vectors according to a second embodiment of the present invention and an example of an order of switching the basic voltage vectors and the zero vectors, respectively;

FIGS. 19A to 19D are timing charts of logical states (switching patterns) of a semiconductor switching element on a DC-bus positive-pole side controlled by four ways of switching the basic voltage vectors and the zero vectors shown in FIG. 18B (pattern #22);

FIGS. 20A and 20B are diagrams of a relation between three basic voltage vectors and two zero vectors on a phase plane when the inverter rotation angle is near 180 degrees in generating a PWM signal using the basic voltage vectors and the zero vectors according to a second embodiment of the present invention and an example of an order of switching the basic voltage vectors and the zero vectors, respectively;

FIGS. 21A to 21D are timing charts of logical states (switching patterns) of a semiconductor switching element on a DC-bus positive-pole side controlled by four ways of switching the basic voltage vectors and the zero vectors shown in FIG. 20B (pattern #23);

FIGS. 22A and 22B are diagrams of a relation between three basic voltage vectors and two zero vectors on a phase plane when the inverter rotation angle is near 240 degrees in generating a PWM signal using the basic voltage vectors and the zero vectors according to a second embodiment of the present invention and an example of an order of switching the basic voltage vectors and the zero vectors, respectively;

FIGS. 23A to 23D are timing charts of logical states (switching patterns) of a semiconductor switching element on a DC-bus positive-pole side controlled by four ways of switching the basic voltage vectors and the zero vectors shown in FIG. 22B (pattern #24);

FIGS. 24A and 24B are diagrams of a relation between three basic voltage vectors and two zero vectors on a phase plane when the inverter rotation angle is near 300 degrees in generating a PWM signal using the basic voltage vectors and the zero vectors according to a second embodiment of the present invention and an example of an order of switching the basic voltage vectors and the zero vectors, respectively;

FIGS. 25A to 25D are timing charts of logical states (switching patterns) of a semiconductor switching element on a DC-bus positive-pole side controlled by four ways of switching the basic voltage vectors and the zero vectors shown in FIG. 24B (pattern #25);

FIGS. 26A and 26B are diagrams of a relation between three basic voltage vectors and two zero vectors on a phase plane when the inverter rotation angle is near 0 degrees in generating a PWM signal using the basic voltage vectors and the zero vectors according to a second embodiment of the present invention and an example of an order of switching the basic voltage vectors and the zero vectors, respectively;

FIGS. 27A to 27D are timing charts of logical states (switching patterns) of a semiconductor switching element on a DC-bus positive-pole side controlled by four ways of switching the basic voltage vectors and the zero vectors shown in FIG. 26B (pattern #26);

FIGS. 31A and 31B are diagrams of a relation between three basic voltage vectors having a phase difference of 120 degrees and a zero vector on a phase plane when the inverter rotation angle is near 60 degrees in generating a PWM signal according to the fourth embodiment and an example of an order of switching the basic voltage vectors and the zero vector, respectively;

FIGS. 32A and 32B are timing charts of a logical state (a switching pattern) of a semiconductor switching element on a DC-bus positive-pole side controlled by two ways of switching the basic voltage vectors and the zero vector shown in FIG. 31B (pattern #31);

FIGS. 33A and 33B are diagrams of a relation between three basic voltage vectors having a phase difference of 120 degrees and a zero vector on a phase plane when the inverter rotation angle is near 120 degrees in generating a PWM signal according to the fourth embodiment and an example of an order of switching the basic voltage vectors and the zero vector, respectively;

FIGS. 34A and 34B are timing charts of a logical state (a switching pattern) of a semiconductor switching element on a DC-bus positive-pole side controlled by two ways of switching the basic voltage vectors and the zero vector shown in FIG. 32B (pattern #32);

FIG. 36 is a block diagram of an example of a conventional inverter;

FIG. 37 is a table of a relation between eight kinds of basic voltage vectors, switching modes corresponding to the basic voltage vectors, and phase currents that can be observed as a DC bus current Idc;

FIG. 38 is a diagram for explaining a phase relation between the basic voltage vectors and a relation between the inverter rotation angle and a voltage command vector;

FIGS. 39A and 39B are diagrams of a relation between the basic voltage vectors used for a first combination in the PWM-signal creating unit shown in FIG. 36 on a phase plane and an example of an order of switching the basic voltage vectors, respectively;

FIG. 40 is a timing chart of an example of a logical state (a switching pattern) of a semiconductor switching element on a DC-bus positive-pole side controlled by the first combination;

FIGS. 41A and 41B are diagrams of a relation between the basic voltage vectors used for a second combination in the PWM-signal creating unit shown in FIG. 36 on a phase plane and an example of an order of switching the basic voltage vectors, respectively; and FIG. 42 is a timing chart of an example of a logical state (a switching pattern) of a semiconductor switching element on a DC-bus positive-pole side controlled by the second combination.

EXPLANATIONS OF LETTERS OR NUMERALS

Figure 2A:
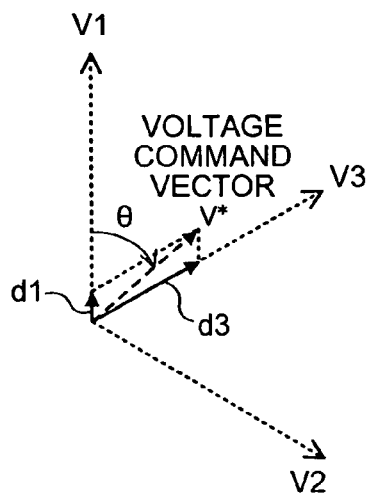
FIGS. 2A to 2C are graphs for explaining an operation for generating a PWM signal using three basic voltage vectors and one kind of zero vector in a PWM-signal generating unit shown in FIG. 1.

1 Inverter main circuit
3 DC power supply
4a, 4b DC buses
5a, 5b, 5c, 5d, 5e, 5f semiconductor switching elements
6a, 6b, 6c, 6d, 6e, 6f Flywheel diodes
7 Motor
9 DC current detecting unit
11 Phase current discriminating unit
12 Unit for calculating an excitation current and a torque current 13 Voltage-command-vector calculating unit
15 PWM-signal generating-unit
20 Inverter control unit
21 PWM-signal generating unit
22 PWM-signal-duty creating unit
23 PWM-signal-duty redistributing unit
25, 26, 27 Virtual voltage vectors
31, 32, 33 Virtual voltage vectors
35C6, 37 Virtual voltage vectors
41, 42 Switching points

BEST MODE(S) FOR CARRYING OUT THE INVENTION

Exemplary embodiments of a three-phase PWM-signal generating apparatus according to the present invention are explained in detail below with reference to the drawings.

First Embodiment

FIG. 1 is a block diagram of an inverter including a three-phase PWM-signal generating apparatus according to a first embodiment of the present invention. Note that, in FIG. 1, components identical with or equivalent to the components shown in FIG. 36 (the conventional example) are denoted by the identical reference numerals and signs. Sections related to the first embodiment are mainly explained here.

As shown in FIG. 1, in the first embodiment, an inverter control unit 20 is provided instead of the inverter control unit 2 in the constitution shown in FIG. 36 (the conventional example). In the inverter control unit 20, a PWM-signal creating unit 21 is provided instead of the PWM-signal creating unit 14 shown in FIG. 36 (the conventional example).

The PWM-signal creating unit 21 includes a PWM-signal-duty creating unit 22, which receives a voltage command vector V* from the voltage-command-vector calculating unit 13, and a PWM-signal-duty redistributing unit 23, which receives an output of the PWM-signal-duty creating unit 22 and outputs conducting time signals Tup, Tun, Tvp, Tvn, Twp, and Twn to the PWM-signal generating unit 15.

Figure 2B:
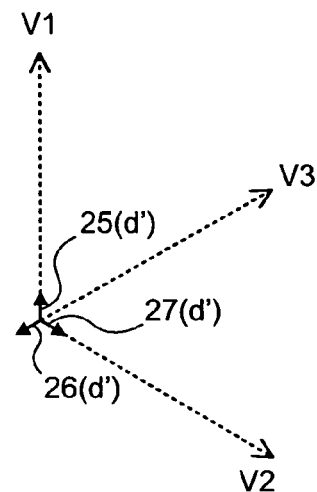
Figure 2C:
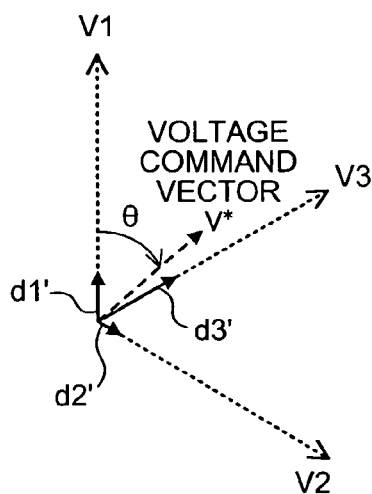

An operation of the PWM-signal creating unit 21 according to the first embodiment is explained here. FIGS. 2A to 2C are graphs for explaining an operation of the PWM-signal creating unit 21. FIG. 2A is a diagram for explaining an operation of the PWM-signal-duty creating unit 22. FIG. 2B is a diagram for explaining a virtual voltage vector used in the PWM-signal-duty redistributing unit 23. FIG. 2C is a diagram for explaining an operation of the PWM-signal-duty redistributing unit 23.

The PWM-signal-duty creating unit 22 decomposes the voltage command vector V* from the voltage-command-vector calculating unit 13 in directions of two basic voltage vectors on both sides of the voltage command vector V* to thereby generate production time ratios of the respective basic voltage vectors. In other words, the PWM-signal-duty creating unit 22 produces two kinds of basic voltage vectors with a phase difference of 60 degrees having the production time ratios as vector lengths and at least one kind of a zero vector. This system is the same as the conventional three-phase modulation system or two-phase modulation system. This is explained specifically with reference to FIG. 2A.

In FIG. 2A, basic voltage vectors V3 and V2 are arranged at an interval of 60 degrees clockwise on a phase plane having a direction of the basic voltage vector V1 as an initial phase. When an inverter rotation angle θ is near 60 degrees, that is, when the voltage command vector V* is present between the basic voltage vector V1 and the basic voltage vector V3 (in FIG. 2A, the voltage command vector V* is near the basic voltage vector V3). A state of generation of production time ratios in this case is shown in FIG. 2A. As shown in FIG. 2A, when the voltage command vector V* is present between the basic voltage vector V1 and the basic voltage vector V3, the PWM-signal-duty creating unit 22 decomposes the voltage command vector V* in two directions of the basic voltage vector V1 and the basic voltage vector V3 to thereby generate a production time ratio d1 of the basic voltage vector V1 and a production time ratio d3 of the basic voltage vector V3. Although not shown in the figure, a zero vector corresponding to the voltage command vector V* is also produced simultaneously.

As shown in FIG. 2A, when the voltage command vector V* is near the basic voltage vector V3, the production time ratio d3 of the basic voltage vector V3 is long but the production time ratio d1 of the basic voltage vector V1 is short. Therefore, in the conventional three-phase modulation system or two-phase modulation system, there is a problem in that it is difficult to detect an electric current at the time when the basic voltage vector V1 is produced.

Concerning this problem, for example, if PWM signal generation is performed with a combination of the basic voltage vectors V1, V2, and V3 and the zero vector V0 during one carrier control period, it is possible to perform current detection easily even if a percentage modulation is low and apply the current detection to a range in which the percentage modulation is equal to or higher than 0.5. In addition, it is possible to prevent excessive deterioration of efficiency.

In other words, if it is possible to generate a PWM signal using three kinds of basic voltage vectors having phase differences of 60 degrees and one kind of a zero vector, the voltage-command-vector calculating unit 13 can produce the voltage command vector V* with a high degree of freedom that makes it easy to detect an electric current and has a less limitation of a percentage modulation and less deterioration of efficiency.

However, for a voltage command vector produced by a PWM signal according to such a simple combination of three kinds of basic voltage vectors having phase differences of 60 degrees and one kind of a zero vector, it is difficult to set rules for vector production by the simple decomposition in two directions shown in FIG. 2A. Thus, PWM signal generation cannot be performed simply. In this case, a new rule for decomposing a voltage command vector in three directions is required.

Thus, in the first embodiment, after the vector production by the decomposition in two directions shown in FIG. 2A, the voltage command vector is further decomposed into three basic voltage vectors having phase differences of 60 degrees and one zero vector using a zero vector such that rules can be set for vector production. The PWM signal duty redistribution unit 23 performs this operation. This is explained below specifically.

The zero vector is a vector that does not originally have a length. It can be considered that the zero vector may be virtually replaced with a sum of three voltage vectors with phase differences of 120 degrees having equal production time ratios as long as a production time allows. Three voltage vectors having phase differences of 120 degrees with the same vector lengths are hereinafter referred to as virtual voltage vectors. In FIG. 2B, three virtual voltage vectors 25, 26, and 27 with phase differences of 120 degrees having equal production time ratios d' are superimposed on three basic voltage vectors V1, V3, and V2 having phase differences of 60 degrees shown in FIG. 2A. As shown in FIG. 2B, the virtual voltage vector 25 is in-phase with the basic voltage vector V1, the virtual voltage vector 26 is anti-phase with the basic voltage vector V3, and the virtual voltage vector 27 is in-phase with the basis voltage vector V2.

The PWM-signal-duty redistributing unit 23 superimposes three virtual voltage vectors in directions of basic voltage vectors having phase differences of 120 degrees, respectively, to add up production time ratios of both the virtual voltage vectors and the basic voltage vectors such that a direction of a basic voltage vector, which has a short production time ratio and with which current detection is difficult, of the two kinds of basic voltage vectors produced by the conventional two-phase modulation system or three-phase modulation system shown in FIG. 2A is included. In the example shown in FIG. 2A, since the production time ratio d1 of the basic voltage vector V1 is short, as shown in FIG. 2C, the PWM-signal-duty redistributing unit 23 superimposes the three virtual voltage vectors with the equal production time ratios d' on the basic voltage vector V1, the basic voltage vector V2, and the basic voltage vector V4 (−V3) to add up production time ratios thereof.

As a result, production time ratios d1', d2', and d3' in the directions of the basic voltage vectors V1, V2, and V3 are as follows: d1'=d1+d', d2'=d', and d3'=d3−d'. A result of the addition does not exceed a value 1. In other words, d1'+d2'+d3'≦1 is a constraint in the PWM-signal-duty redistributing unit 23. According to such simple processing, it is possible to increase the production time ratio of the basic voltage vector V1, which is short in the conventional system shown in FIG. 2A, by a magnitude of the virtual voltage vector. This makes it easy to perform current detection. The PWM-signal-duty redistributing unit 23 redistributes a production time ratio of a voltage command vector to three kinds of basic voltage vectors having phase differences of 60 degrees and one zero vector using a zero vector under a condition that a result of addition is equal to or smaller than the value 1.

Figure 3A:
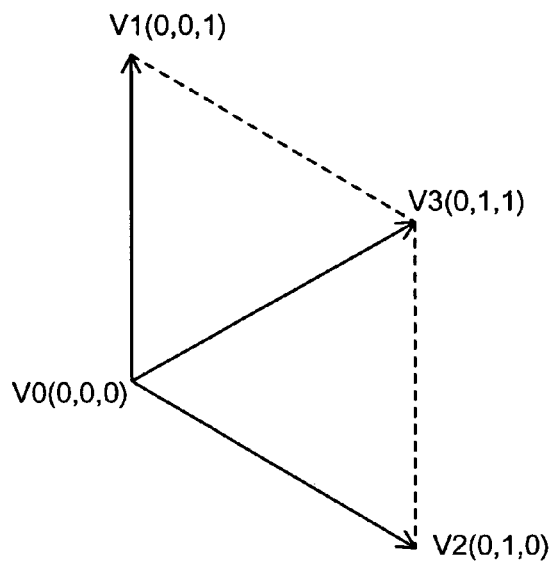
FIGS. 3A and 3B are diagrams of a relation between the basic voltage vectors and the zero vector on a phase plane when an inverter rotation angle is near 60 degrees in generating a PWM signal and an example of an order of switching the basic voltage vectors and the zero vector, respectively.
Figure 3B:
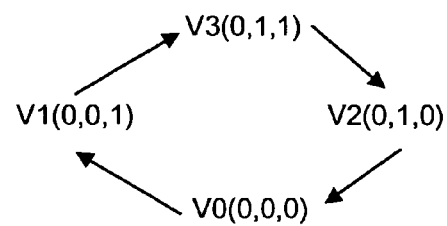
Figure 4:
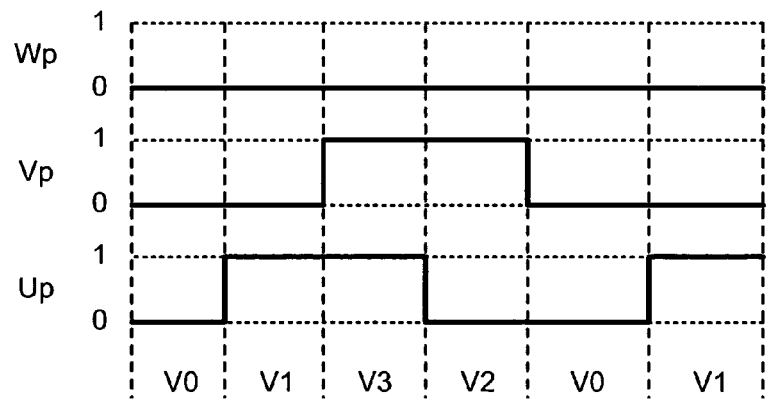
FIG. 4 is a timing chart of an example of a logical state (a switching pattern) of a semiconductor switching element on a DC-bus positive-pole side controlled by switching of the basic voltage vectors and the zero vector shown in FIG. 3B (pattern #1)

A three-phase PWM signal produced by the simple method described above is specifically explained with reference to FIGS. 3A to 14. FIGS. 3A and 3B are diagrams of a relation on a phase plane at the time when an inverter rotation angle is near 60 degrees in generating a PWM signal using three kinds of basic voltage vectors and one kind of a zero vector and an example of an order of switching of the three kinds of basic voltage vectors and the one kind of a zero vector. FIG. 4 is a timing chart of an example of a logical state (a switching pattern) of semiconductor switching elements on a DC bus positive pole side controlled according to the switching of the three kinds of basic voltage vectors and the one kind of a zero vector shown in FIG. 3B.

In FIG. 3A, the basic voltage vector V3 (0, 1, 1), the basic voltage vector V2 (0, 1, 0), and the zero vector V0 (0, 0, 0), which relate to one another when the inverter rotation angle θ is near 60 degrees with the basic voltage vector V1 (0, 0, 1) as an initial phase, are shown. When the inverter rotation angle θ is near 60 degrees, as shown in FIG. 3B, it is possible to generate the conducting time signals Tup, Tun, Tvp, Tvn, Twp, and Twn by switching the basic voltage vectors and the zero vector in an order of V0, V1, V3, V2, V0, and V1. Note that, opposite to FIG. 3B, the basic voltage vectors and the zero vector may be switched in an order of V0, V2, V3, V1, V0, and V2.

A logical state (a switching pattern) during one carrier control period of semiconductor switching elements 5a, 5c, and 5e on a DC bus positive pole side at the time when the basic voltage vectors and the zero vector are switched as shown in FIG. 3B are as shown in FIG. 4. This is set as a pattern #1. It is seen that a state of output to the motor 7 by driving signals Wp, Vp, and Up given to the semiconductor switching elements 5a, 5c, and 5e by the PWM-signal generating unit 15 changes in the switching order shown in FIG. 3B.

When the example of FIG. 2C is applied to FIG. 4, a conducting time ratio of a U-phase positive pole side switching element is d1'+d3'. A conducting time ratio of a V-phase positive pole side switching element is d2'+d3'. A conducting time ratio of a W-phase positive pole side switching element is 0. In other words, the W-phase positive pole side switching element is always in an OFF operation state. Conducting time ratios of negative pole side switching elements 5b, 5d, and 5f in the respective phases are calculated by subtracting the conducting time ratios of the positive pole side switching elements 5a, 5c, and 5e from the value 1. Conducting times during one carrier control period of the respective switching elements are decided by multiplying these values by one carrier control period.

In this way, the PWM-signal-duty redistributing unit 23 obtains the conducting times Tup, Tvp, and Twp during one carrier control period of the U-phase, V-phase, and W-phase positive pole side switching elements 5a, 5c, and 5e and the conducting times Tun, Tvn, and Twn during one carrier control period of the negative pole side switching elements 5b, 5d and 5f. Based on the conducting times, the PWM-signal generating unit 15 emits driving signals Up, Vp, Wp, Un, Vn, and Wn to the semiconductor switching elements 5a, 5c, 5e, 5b, 5d, and 5f to make it possible to drive the motor 7.

Figure 12:
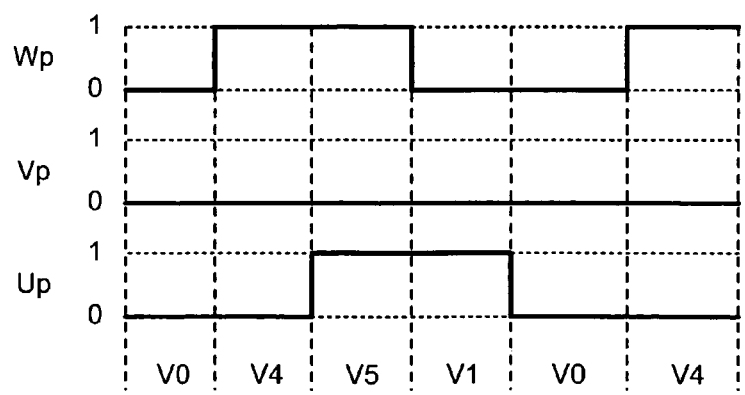
FIG. 12 is a timing chart of an example of a logical state (a switching pattern) of a semiconductor switching element on a DC-bus positive-pole side controlled by switching of the basic voltage vectors and the zero vector shown in FIG. 11B (pattern #5)
Figure 13A:
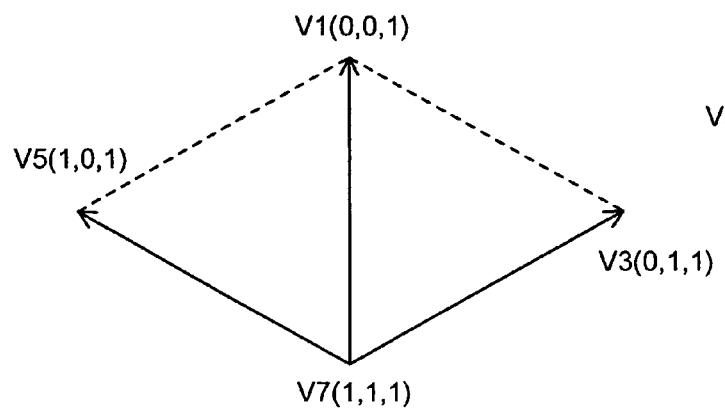
FIGS. 13A and 13B are diagrams of a relation between the basic voltage vectors and the zero vector on a phase plane when the inverter rotation angle is near 0 degrees in generating a PWM signal and an example of an order of switching the basic voltage vectors and the zero vector, respectively.
Figure 13B:
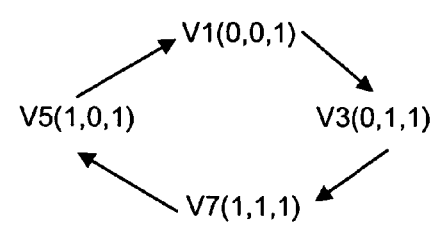
Figure 14:
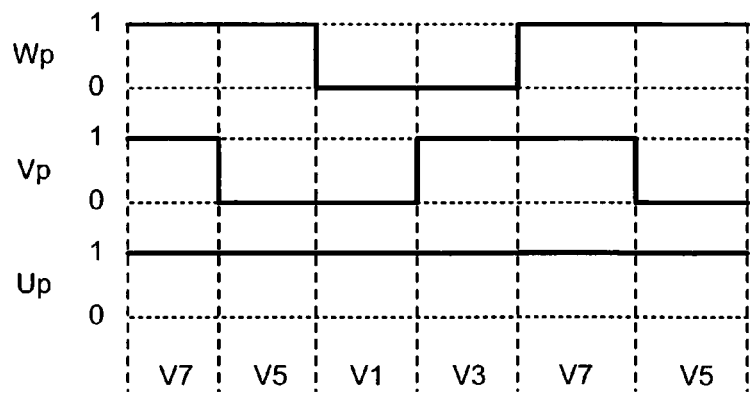
FIG. 14 is a timing chart of an example of a logical state (a switching pattern) of a semiconductor switching element on a DC-bus positive-pole side controlled by switching of the basic voltage vectors and the zero vector shown in FIG. 13B (pattern #6)

Similarly, it is also possible to show a generation state of a PWM signal, with the basic voltage vector V1 as an initial phase, at the time when the inverter rotation angle θ is near 120 degrees (in a direction of the basic voltage vector V2) (FIGS. 5A to 6), at the time when the inverter rotation angle θ is near 180 degrees (in a direction of the basic voltage vector V6) (FIGS. 7A to 8), at the time when the inverter rotation angle θ is near 240 degrees (in a direction of the basic voltage vector V4) (FIGS. 9A to 10), at the time when the inverter rotation angle θ is near 300 degrees (in a direction of the basic voltage vector V5) (FIGS. 11A to 12), and at the time when the inverter rotation angle θ is near 0 degree (in a direction of the basic voltage vector V1) (FIGS. 13A to 14).

Figure 5A:
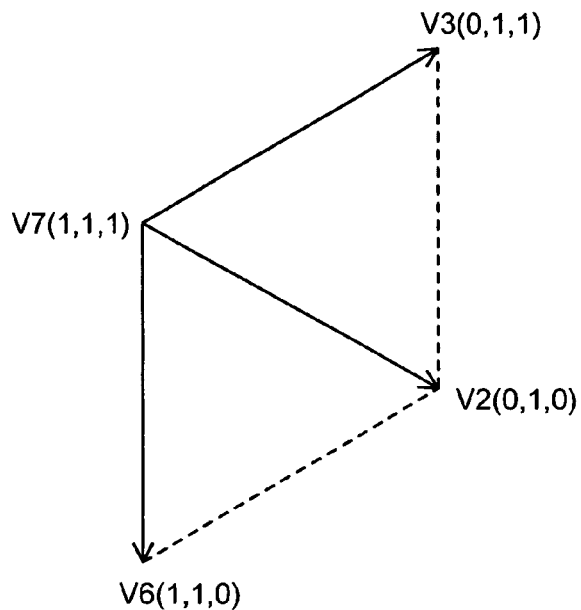
FIGS. 5A and 5B are diagrams of a relation between the basic voltage vectors and the zero vector on a phase plane when the inverter rotation angle is near 120 degrees in generating a PWM signal and an example of an order of switching the basic voltage vectors and the zero vector, respectively.
Figure 5B:
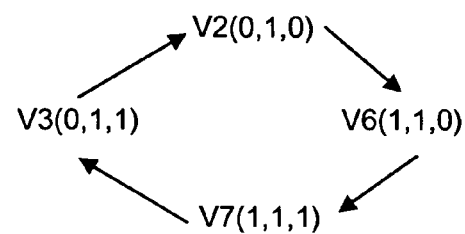
Figure 6:
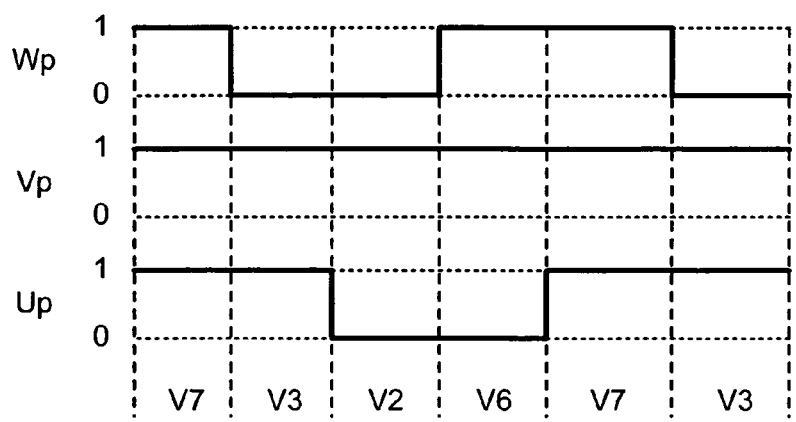
FIG. 6 is a timing chart of an example of a logical state (a switching pattern) of a semiconductor switching element on a DC-bus positive-pole side controlled by switching of the basic voltage vectors and the zero vector shown in FIG. 5B (pattern #2)

FIGS. 5A and 5B are diagrams of a relation on a phase plane at the time when the inverter rotation angle θ is near 120 degrees in generating a PWM signal using three kinds of basic voltage vectors and one kind of a zero vector and an example of an order of switching of the three kinds of basic voltage vectors. FIG. 6 is a timing chart of an example of a logical state (a switching pattern) of semiconductor switching elements on a DC bus positive pole side controlled according to the switching of the three kinds of basic voltage vectors shown in FIG. 5B.

In FIG. 5A, the basic voltage vector V3 (0, 1, 1), the basic voltage vector V2 (0, 1, 0), the basic voltage vector V6 (1, 1, 0), and the zero vector V7 (1, 1, 1), which relate to one another when the inverter rotation angle θ is near 120 degrees, are shown. When the inverter rotation angle θ is near 120 degrees, as shown in FIG. 5B, it is possible to generate the conducting time signals Tup, Tun, Tvp, Tvn, Twp, and Twn by switching the basic voltage vectors and the zero vector in an order of V7, V3, V2, V6, V7, and V3. Note that, opposite to FIG. 5B, the basic voltage vectors and the zero vector may be switched in an order of V7, V6, V2, V3, V7, and V6.

A logical state (a switching pattern) during one carrier control period of the semiconductor switching elements 5a, 5c, and 5e on a DC bus positive pole side at the time when the basic voltage vectors and the zero vector are switched as shown in FIG. 5B are as shown in FIG. 6. This is set as a pattern #2. It is seen that a state of output to the motor 7 by the driving signals Wp, Vp, and Up given to the semiconductor switching elements 5a, 5c, and 5e by the PWM-signal generating unit 15 changes in the switching order shown in FIG. 5B. In this case, the V-phase positive pole side semiconductor switching element is always in an ON operation state.

Figure 7A:
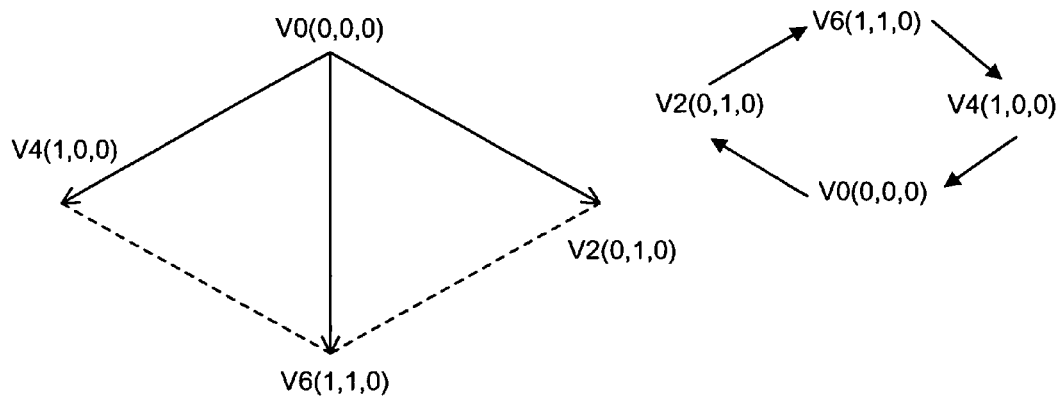
FIGS. 7A and 7B are diagrams of a relation between the basic voltage vectors and the zero vector on a phase plane when the inverter rotation angle is near 180 degrees in generating a PWM signal and an example of an order of switching the basic voltage vectors and the zero vector, respectively.
Figure 7B:
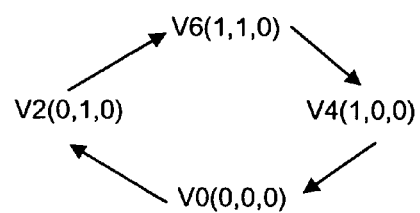
Figure 8:
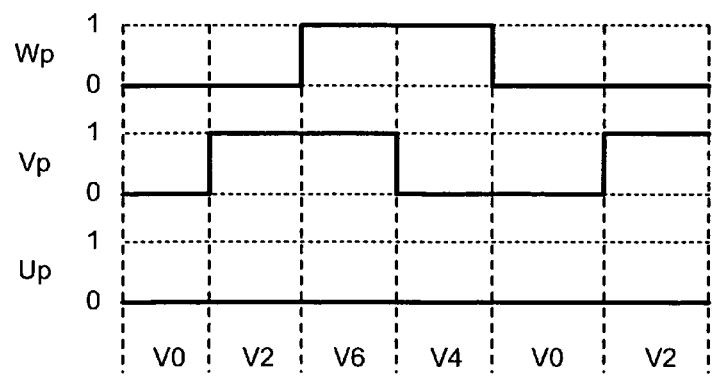
FIG. 8 is a timing chart of an example of a logical state (a switching pattern) of a semiconductor switching element on a DC-bus positive-pole side controlled by switching of the basic voltage vectors and the zero vector shown in FIG. 7B (pattern #3)

FIGS. 7A and 7B are diagrams of a relation on a phase plane at the time when the inverter rotation angle θ is near 180 degrees in generating a PWM signal using three kinds of basic voltage vectors and one kind of a zero vector and an example of an order of switching of the three kinds of basic voltage vectors. FIG. 8 is a timing chart of an example of a logical state (a switching pattern) of semiconductor switching elements on a DC bus positive pole side controlled according to the switching of the three kinds of basic voltage vectors shown in FIG. 7B.

In FIG. 7A, the basic voltage vector V2 (0, 1, 0), the basic voltage vector V6 (1, 1, 0), the basic voltage vector V4 (1, 0, 0), and the zero vector V0 (0, 0, 0), which relate to one another when the inverter rotation angle θ is near 180 degrees, are shown. When the inverter rotation angle θ is near 180 degrees, as shown in FIG. 7B, it is possible to generate the conducting time signals Tup, Tun, Tvp, Tvn, Twp, and Twn by switching the basic voltage vectors and the zero vector in an order of V0, V2, V6, V4, V0, and V2. Note that, opposite to FIG. 7B, the basic voltage vectors and the zero vector may be switched in an order of V0, V4, V6, V2, V0, and V4.

A logical state (a switching pattern) during one carrier control period of the semiconductor switching elements 5a, 5c, and 5e on a DC bus positive pole side at the time when the basic voltage vectors and the zero vector are switched as shown in FIG. 7B are as shown in FIG. 8. This is set as a pattern #3. It is seen that a state of output to the motor 7 by the driving signals Wp, Vp, and Up given to the semiconductor switching elements 5a, 5c, and 5e by the PWM-signal generating unit 15 changes in the switching order shown in FIG. 7B. In this case, the U-phase positive pole side semiconductor switching element is always in an OFF operation state.

Figure 9A:
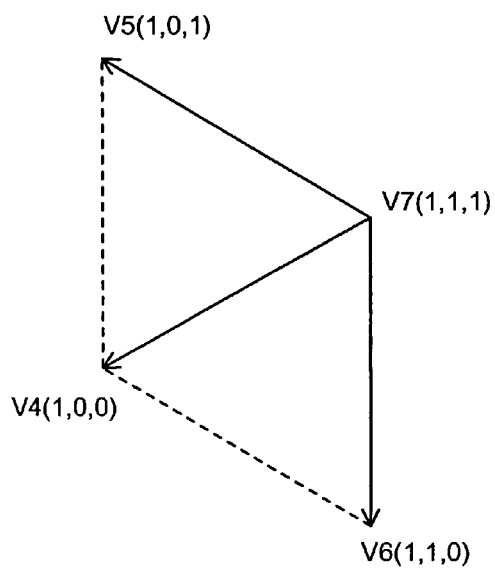
FIGS. 9A and 9B are diagrams of a relation between the basic voltage vectors and the zero vector on a phase plane when the inverter rotation angle is near 240 degrees in generating a PWM signal and an example of an order of switching the basic voltage vectors and the zero vector, respectively.
Figure 9B:
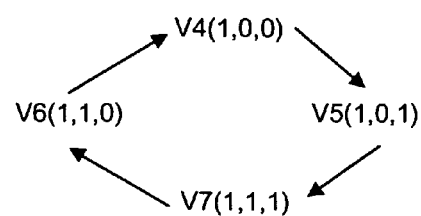
Figure 10:
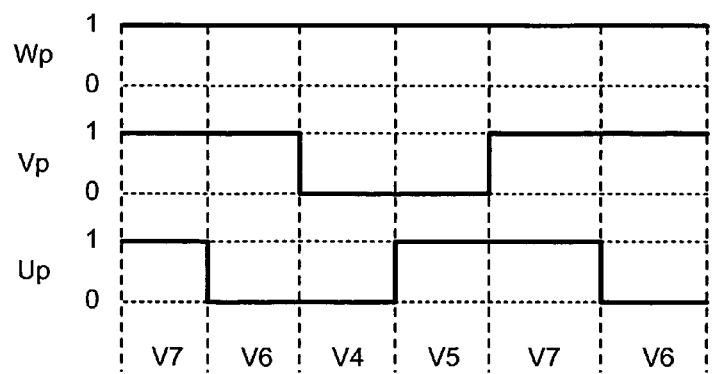
FIG. 10 is a timing chart of an example of a logical state (a switching pattern) of a semiconductor switching element on a DC-bus positive-pole side controlled by switching of the basic voltage vectors and the zero vector shown in FIG. 9B (pattern #4)

FIGS. 9A and 9B are diagrams of a relation on a phase plane at the time when the inverter rotation angle θ is near 240 degrees in generating a PWM signal using three kinds of basic voltage vectors and one kind of a zero vector and an example of an order of switching of the three kinds of basic voltage vectors. FIG. 10 is a timing chart of an example of a logical state (a switching pattern) of semiconductor switching elements on a DC bus positive pole side controlled according to the switching of the three kinds of basic voltage vectors shown in FIG. 9B.

In FIG. 9A, the basic voltage vector V6 (1, 1, 0), the basic voltage vector V4 (1, 0, 0), the basic voltage vector V5 (1, 0, 1), and the zero vector V7 (1, 1, 1), which relate to one another when the inverter rotation angle θ is near 240 degrees, are shown. When the inverter rotation angle θ is near 240 degrees, as shown in FIG. 9B, it is possible to generate the conducting time signals Tup, Tun, Tvp, Tvn, Twp, and Twn by switching the basic voltage vectors and the zero vector in an order of V7, V6, V4, V5, V7, and V6. Note that, opposite to FIG. 9B, the basic voltage vectors and the zero vector may be switched in an order of V7, V5, V4, V6, V7, and V5.

A logical state (a switching pattern) during one carrier control period of the semiconductor switching elements 5a, 5c, and 5e on a DC bus positive pole side at the time when the basic voltage vectors and the zero vector are switched as shown in FIG. 9B are as shown in FIG. 10. This is set as a pattern #4. It is seen that a state of output to the motor 7 by the driving signals Wp, Vp, and Up given to the semiconductor switching elements 5a, 5c, and 5e by the PWM-signal generating unit 15 changes in the switching order shown in FIG. 9B. In this case, the W-phase positive pole side semiconductor switching element is always in an ON operation state.

Figure 11A:
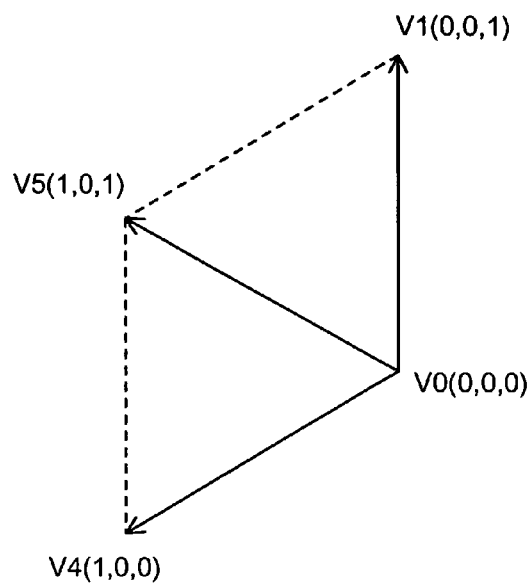
FIGS. 11A and 11B are diagrams of a relation between the basic voltage vectors and the zero vector on a phase plane when the inverter rotation angle is near 300 degrees in generating a PWM signal and an example of an order of switching the basic voltage vectors and the zero vector, respectively.
Figure 11B:
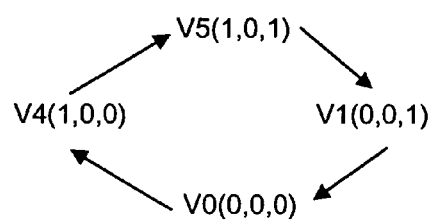

FIGS. 11A and 11B are diagrams of a relation on a phase plane at the time when the inverter rotation angle θ is near 300 degrees in generating a PWM signal using three kinds of basic voltage vectors and one kind of a zero vector and an example of an order of switching of the three kinds of basic voltage vectors. FIG. 12 is a timing chart of an example of a logical state (a switching pattern) of semiconductor switching elements on a DC bus positive pole side controlled according to the switching of the three kinds of basic voltage vectors shown in FIG. 11B.

In FIG. 11A, the basic voltage vector V4 (1, 0, 0), the basic voltage vector V5 (1, 0, 1), the basic voltage vector V1 (0, 0, 1), and the zero vector V0 (0, 0, 0), which relate to one another when the inverter rotation angle θ is near 300 degrees, are shown. When the inverter rotation angle θ is near 300 degrees, as shown in FIG. 11B, it is possible to generate the conducting time signals Tup, Tun, Tvp, Tvn, Twp, and Twn by switching the basic voltage vectors and the zero vector in an order of V0, V4, V5, V1, V0, and V4. Note that, opposite to FIG. 11B, the basic voltage vectors and the zero vector may be switched in an order of V0, V1, V5, V4, V0, and V1.

A logical state (a switching pattern) during one carrier control period of the semiconductor switching elements 5a, 5c, and 5e on a DC bus positive pole side at the time when the basic voltage vectors and the zero vector are switched as shown in FIG. 11B are as shown in FIG. 12. This is set as a pattern #5. It is seen that a state of output to the motor 7 by the driving signals Wp, Vp, and Up given to the semiconductor switching elements 5a, 5c, and 5e by the PWM-signal generating unit 15 changes in the switching order shown in FIG. 11B. In this case, the V-phase positive pole side semiconductor switching element is always in an OFF operation state.

FIGS. 13A and 13B are diagrams of a relation on a phase plane at the time when the inverter rotation angle θ is near 0 degree in generating a PWM signal using three kinds of basic voltage vectors and one kind of a zero vector and an example of an order of switching of the three kinds of basic voltage vectors. FIG. 14 is a timing chart of an example of a logical state (a switching pattern) of semiconductor switching elements on a DC bus positive pole side controlled according to the switching of the three kinds of basic voltage vectors shown in FIG. 13B.

In FIG. 13A, the basic voltage vector V5 (1, 0, 1), the basic voltage vector V1 (0, 0, 1), the basic voltage vector V3 (0, 1, 1), and the zero vector V7 (1, 1, 1), which relate to one another when the inverter rotation angle θ is near 0 degree, are shown. When the inverter rotation angle θ is near 0 degree, as shown in FIG. 13B, it is possible to generate the conducting time signals Tup, Tun, Tvp, Tvn, Twp, and Twn by switching the basic voltage vectors and the zero vector in an order of V7, V5, V1, V3, V7, and V5. Note that, opposite to FIG. 13B, the basic voltage vectors and the zero vector may lbe switched in an order of V7, V3, V1, V5, V7, and V3.

A logical state (a switching pattern) during one carrier control period of the semiconductor switching elements 5a, 5c, and 5e on a DC bus positive pole side at the time when the basic voltage vectors and the zero vector are switched as shown in FIG. 13B are as shown in FIG. 14. This is set as a pattern #6. It is seen that a state of output to the motor 7 by the driving signals Wp, Vp, and Up given to the semiconductor switching elements 5a, 5c, and 5e by the PWM-signal generating unit 15 changes in the switching order shown in FIG. 13B. In this case, the U-phase positive pole side semiconductor switching element is always in an ON operation state.

The method of generating a PWM signal using three kinds of basic voltage vectors having phase differences of 60 degrees and one kind of a zero vector is particularly effective when the inverter rotation angle θ is near integer times of 60 degrees, that is, near the basic voltage vectors V1 to V6. Thus, it is advisable to perform switching of the patterns #1 to #6 near the middle of two basic voltage vectors having a phase difference of 60 degrees. This is represented as a general Equation as follows.

When the inverter rotation angle θ located in the middle of two basic voltage vectors having a phase difference of 60 degrees is assumed to be at a switching phase angle θα with respect to the inverter rotation angle θ with the direction of the basic voltage vector V1 as an initial phase, the switching phase angle θα can be represented as θα=30+60×n using an integer n.

Figures 15A, 15B:
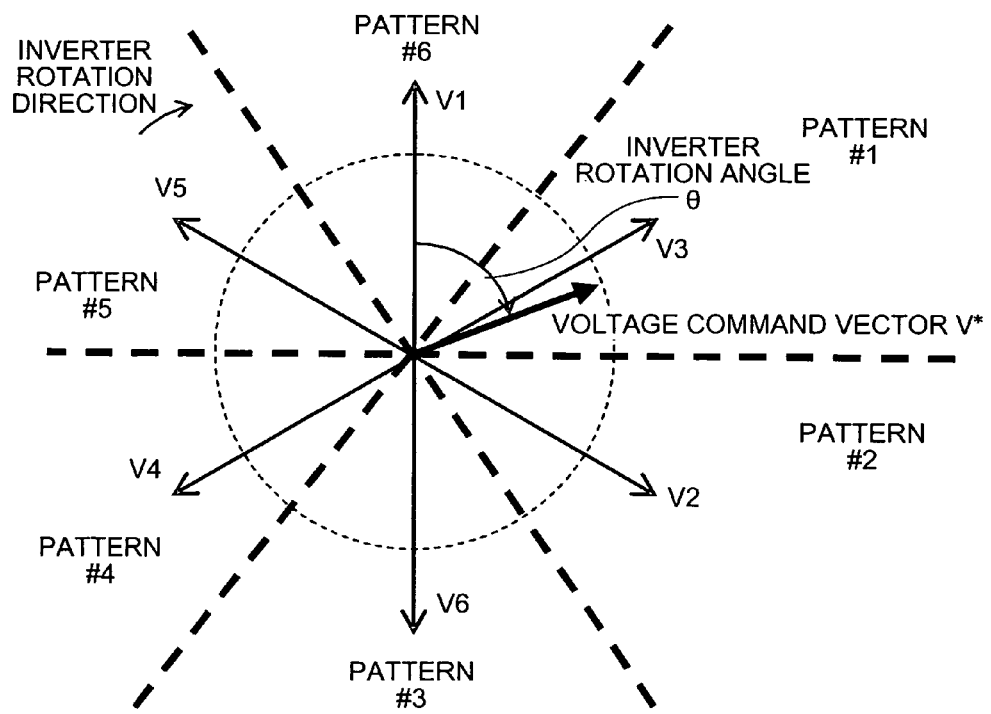
FIG. 15A is a table of relations between the inverter rotation angle θ and the patterns #1 to #6.
FIG. 15B is a diagram of the relation between the inverter rotation angle θ and the patterns #1 to #6 shown in FIG. 15A on a phase plane.

FIG. 15A is a table of a relation between the inverter rotation angle θ and the patterns #1 to #6. FIG. 15B is a diagram of the relation between the inverter rotation angle θ and the patterns #1 to #6 on a phase plane. As shown in FIGS. 15A and 15B, the inverter rotation angle θ with the direction of the basic voltage vector V1 as an initial phase is the pattern #6 shown in FIG. 14 at 0°≦θ<30°, the pattern #1 shown in FIG. 4 at 30°≦θ<90°, the pattern #2 shown in FIG. 6 at 90°≦θ<150°, the pattern #3 shown in FIG. 8 at 150°≦θ<210°, the pattern #4 shown in FIG. 10 at 210°≦θ<270°, the pattern #5 shown in FIG. 12 at 270°≦θ<330°, and the pattern #6 shown in FIG. 14 at 330°≦θ<360°. Note that, in FIG. 15A, ranges of the respective patterns are represented as "A degrees or more and B degrees or less". However, an end point of a range may be included in either side.

In this way, according to the first embodiment, it is possible to generate a PWM signal having a high degree of freedom of a percentage modulation and preventing excessive deterioration of efficiency with the simple method of using three kinds of basic voltage vector having phase differences of 60 degrees and one kind of a zero vector without adding a special device.

In the above explanation, a PWM signal is generated with a combination of three kinds of basic voltage vectors having phase differences of 60 degrees and one kind of a zero vector. However, it is possible to generate a PWM signal in the same idea when two kinds of zero vectors are used. This is explained specifically as a second embodiment.

Second Embodiment

In an inverter including a three-phase PWM-signal generating apparatus according to a second embodiment of the present invention, a PWM-signal generating unit in the three-phase PWM-signal generating apparatus corresponds to the PWM-signal creating unit 21 in the constitution shown in FIG. 1 (the first embodiment). First, an operation of the PWM-signal-duty creating unit 22 is explained briefly with reference to FIGS. 1 and 2A, although the explanation is redundant.

As explained in the first embodiment, the PWM-signal-duty creating unit 22 decomposes the voltage command vector V* from the voltage-command-vector calculating unit 13 in directions of two basic voltage vectors on both sides of the voltage command vector V* to thereby generate production time ratios of the respective basic voltage vectors. In other words, the PWM-signal-duty creating unit 22 produces two kinds of basic voltage vectors with a phase difference of 60 degrees having the production time ratios as vector lengths and at least one kind of a zero vector.

In the example shown in FIG. 2A, in a phase plane with the direction of the basic voltage vector V1 as an initial phase, when the inverter rotation angle θ is near 60 degrees, that is, when the voltage command vector V* is present between the basic voltage vector V1 and the basic voltage vector V3 (in FIG. 2A, the voltage command vector V* is near the basic voltage vector V3), the PWM-signal-duty creating unit 22 decomposes the voltage command vector V* in two directions of the basic voltage vector V1 and the basic voltage vector V3 to generate a production time ratio d1 of the basic voltage vector V1, a production time ratio d3 of the basic voltage vector V3, and a production time ratio dzero of a zero vector corresponding to the voltage command vector V*, although the production time ratio dzero cannot be shown in the figure. This production time ratio dzero of the zero vector is produced in a relation of dzero=1−d1−d3.

As explained in the first embodiment, the conventional three-phase modulation system or two-phase modulation system shown in FIG. 2A has a problem in that it is difficult to detect an electric current at the time when the basic voltage vector V1 is produced. In the first embodiment coping with this problem, there is a state in which only one set of the three-phase semiconductor switching elements (5a, 5b), (5c, 5d), and (5e, 5f) does not perform switching (see FIGS. 3, 6, 8, 10, 12, and 14), a switching balance of three phases cannot be kept and there is a problem in vibration and noise.

Thus, in this second embodiment, to cope with both the problems, PWM signal generation is performed with, for example, a combination of the basic voltage vectors V1, V2, and V3 and the zero vectors V0 and V7 during one carrier control period. Consequently, the voltage-command-vector calculating unit 13 can produce the voltage command vector V* with a high degree of freedom that makes it easy to detect an electric current, has a less limitation of a percentage modulation and less deterioration of efficiency, and has a vibration/noise reduction effect.

When PWM signal generation is performed with such a combination of three kinds of basic voltage vectors and two kinds of zero vectors, it is also possible to use the method of producing vectors according to two-direction decomposition and, then, further performing vector redistribution by a zero vector shown in FIG. 2A. In other words, the PWM-signal-duty redistributing unit 23 according to the second embodiment performs an operation for redistributing a production time ratio of the voltage command vector V* to three kinds of basic voltage vectors and two kinds of zero vectors in the same idea as explained in the first embodiment. This is explained in detail below using the three kinds of basic voltage vectors V1, V2, and V3 shown in FIG. 2A.

When production time ratios of the three kinds of basic voltage vectors V1, V2, and V3 are d1', d2', and d3', a total production time ratio dzero' of the two kinds of zero vectors after redistribution is represented as follows.

$$Dzero'=1-d1'-d2'-d3' \quad (3)$$

A relation among the total production time ratio dzero', a production time ratio d0' of one zero vector V0, and a production time ratio d7' of the other zero vector V7 is represented as follows when k is assumed to be an arbitrary value within a range of 0 to 1.

$$d0'=k \cdot dzero' \quad (4)$$

$$d7'=(1-k) \cdot dzero' \quad (5)$$

From Equations (4) and (5), concerning the respective production time ratios of the two kinds of zero vectors, it is possible to divide the total production time ratio dzero' at an arbitrary ratio, set one divided production time ratio as the production time ratio d0' of the zero vector V0, and set the other divided production time ratio as the production time ratio d7' of the zero vector V7. In this way, it is also possible to satisfy Equation (3) by allocating the total production time ratio dzero' to the respective production time ratios of the two kinds of zero vectors.

Consequently, the state in which only one set of the three phase semiconductor switching elements (5a, 5b), (5c, 5d), and (5e, 5f) does not perform switching is eliminated (see FIGS. 17, 19, 21, 23, 25, and 27). As a result, since a switching balance of three phases is kept, it is possible to reduce vibration and noise. If a ratio of zero vectors to be divided into to is further changed every moment, it is possible to disperse peak sound near a carrier frequency compared with the time when the ratio is not changed. An acoustic noise reduction effect is obtained.

A three-phase PWM signal generated by a method according to the second embodiment is explained specifically with reference to FIGS. 16A to 27D. FIGS. 16A and 16B are diagrams of a relation on a phase plane at the time when an inverter rotation angle is near 60 degrees in generating a PWM signal using three kinds of basic voltage vectors and two kinds of zero vectors according to a second embodiment of the present invention and an example of an order of switching of the three kinds of basic voltage vectors and the two kinds of zero vectors. FIGS. 17A to 17D are timing charts of logical states (switching patterns) of semiconductor switching elements on a DC bus positive pole side controlled according to four ways of the switching of the three kinds of basic voltage vectors and the two kinds of zero vectors shown in FIG. 16B.

In FIG. 16A, with the basic voltage vector V1 (0, 0, 1) as an initial phase, the basic voltage vector V3 (0, 1, 1), the basic voltage vector V2 (0, 1, 0), the zero vector V0 (0, 0, 0), and the zero vector V7 (1, 1, 1), which relate to one another when the inverter rotation angle θ is near 60 degrees, are shown. It is possible to generate the conducting time signals Tup, Tun, Tvp, Tvn, Twp, and Twn by adopting, as shown in FIG. 16B, for example, any one of (a) V7, V3, V1, V0, and V2, (b) V7, V3, V1, V0, V2, and V3, (c) V7, V3, V2, V0, and V1, and (d) V7, V3, V2, V0, V1, and V3 as a switching order at the time when the inverter rotation angle θ is near 60 degrees. This is set as a pattern #21.

FIGS. 17A to 17D are time charts of logical states (switching patterns) during one carrier control period of the semiconductor switching elements 5a, 5c, and 5e on a DC bus positive pole side in the switching orders (a), (b), (c), and (d) shown in FIG. 16B. As shown in FIGS. 17A to 17D, it is possible to drive the three-phase semiconductor switching elements (5a, 5b), (5c, 5d), and (5e, 5f) to turn ON and OFF without a state in which one set of the three-phase semiconductor switching elements does not perform switching.

Note that the switching orders in (a) to (d) may be reversed. Specifically, in the example of the switching order (a), the switching order may be V2, V0, V1, V3, and V7. Moreover, a switching direction of the switching order may be reversed for each carrier period. In the example of the switching order (a), it is possible that the switching order is V7, V3, V1, V0, and V2 in a certain carrier period and is V2, V0, V1, V3, and V7 in the next carrier control period. The same applies to FIGS. 18B, 20B, 22B, 24B, and 26B described below.

When the example of FIG. 2C is applied to FIG. 17A, a conducting time ratio of the U-phase positive pole side switching element is d1'+d3'+d7'. A conducting time ratio of the V-phase positive pole side switching element is d2'+d3'+d7'. A conducting time ratio of the W-phase positive pole side switching element is d7'. Conducting time ratios of negative pole side switching elements in the respective phases are calculated by subtracting the conducting time ratios of the positive-pole side switching elements from the value 1. Conducting times during one carrier control period of the respective switching elements are decided by multiplying these values by one carrier control period. At the time of actual PWM signal output, a PWM signal is generated taking into account a short circuit prevention time of a switching element.

In this way, the PWM-signal-duty redistributing unit 23 shown in FIG. 1 obtains the conducting times Tup, Tvp, and Twp during one carrier control period of the U-phase, V-phase, and W-phase positive pole side switching elements and the conducting times Tun, Tvn, and Twn during one carrier control period of the negative pole side switching elements. Based on the conducting times, the PWM-signal generating unit 15 emits driving signals Up, Vp, Wp, Un, Vn, and Wn to the semiconductor switching elements 5a, 5c, 5e, 5b, 5d, and 5f to make it possible to drive the motor 7.

Similarly, it is also possible to show a generation state of a PWM signal, with the basic voltage vector V1 as an initial phase, at the time when the inverter rotation angle θ is near 120 degrees (in a direction of the basic voltage vector V2) (FIGS. 18A to 19D), at the time when the inverter rotation angle θ is near 180 degrees (in a direction of the basic voltage vector V6) (FIGS. 20A to 21D), at the time when the inverter rotation angle θ is near 240 degrees (in a direction of the basic voltage vector V4) (FIGS. 22A to 23D), at the time when the inverter rotation angle θ is near 300 degrees (in a direction of the basic voltage vector V5) (FIGS. 24A to 25D), and at the time when the inverter rotation angle θ is near 0 degree (in a direction of the basic voltage vector V1) (FIGS. 26A to 27D). Since generation of a driving signal can be performed in the same ideal as the pattern #21 described above, an explanation of the generation of a driving signal is omitted but an outline thereof is described below.

In FIG. 18A, the basic voltage vector V3 (0, 1, 1), the basic voltage vector V2 (0, 1, 0), the basic voltage vector V6 (1, 1, 0), the zero vector V0 (0, 0, 0), and the zero vector V7 (1, 1, 1), which relate to one another on a phase plane at the time when the inverter rotation angle θ with the basic voltage vector V1 as an initial phase is near 120 degrees in generating a PWM signal using three kinds of basic voltage vectors and two kinds of zero vectors according to the second embodiment of the present invention, are shown. In FIG. 18B, as examples of a switching order of three kinds of basic voltage vectors and two kinds of zero vectors, four ways of switching orders, (a) V7, V3, V0, V2, and V6, (b) V7, V3, V2, V0, V2, and V6, (c) V7, V6, V0, V2, and V3, and (d) V7, V6, V2, V0, V2, and V3 are shown. In FIGS. 19A to 19D, logical states (switching patterns) of semiconductor switching elements on a DC bus positive pole side controlled according to the switching of four ways of three kinds of basic voltage vectors and two kinds of zero vectors shown in FIG. 18B is shown. This is set as a pattern #22.

In FIG. 20A, the basic voltage vector V2 (0, 1, 0), the basic voltage vector V6 (1, 1, 0), the basic voltage vector V4 (1, 0, 0), the zero vector V0 (0, 0, 0), and the zero vector V7 (1, 1, 1), which relate to one another on a phase plane at the time when the inverter rotation angle θ with the basic voltage vector V1 as an initial phase is near 180 degrees in generating a PWM signal using three kinds of basic voltage vectors and two kinds of zero vectors according to the second embodiment of the present invention, are shown. In FIG. 20B, as examples of a switching order of three kinds of basic voltage vectors and two kinds of zero vectors, four ways of switching orders, (a)

V7, V6, V2, V0, and V4, (b) V7, V6, V2, V0, V4, and V6, (c) V7, V6, V4, V0, and V2, and (d) V7, V6, V4, V0, V2, and V6 are shown. In FIGS. 21A to 21D, a logical state (a switching pattern) of semiconductor switching elements on a DC bus positive pole side controlled according to the switching of four ways of three kinds of basic voltage vectors and two kinds of zero vectors shown in FIG. 20B is shown. This is set as a pattern #23.

In FIG. 22A, the basic voltage vector V6 (1, 1, 0), the basic voltage vector V4 (1, 0, 0), the basic voltage vector V5 (1, 0, 1), the zero vector V0 (0, 0, 0), and the zero vector V7 (1, 1, 1), which relate to one another on a phase plane at the time when the inverter rotation angle θ with the basic voltage vector V1 as an initial phase is near 240 degrees in generating a PWM signal using three kinds of basic voltage vectors and two kinds of zero vectors according to the second embodiment of the present invention, are shown. In FIG. 22B, as examples of a switching order of three kinds of basic voltage vectors and two kinds of zero vectors, four ways of switching orders, (a) V7, V6, V0, V4, and V5, (b) V7, V6, V4, V0, V4, and V5, (c) V7, V5, V0, V4, and V6, and (d) V7, V5, V4, V0, V4, and V6 are shown. In FIGS. 23A to 23D, logical states (switching patterns) of semiconductor switching elements on a DC bus positive pole side controlled according to the switching of four ways of three kinds of basic voltage vectors and two kinds of zero vectors shown in FIG. 22B is shown. This is set as a pattern #24.

In FIG. 24A, the basic voltage vector V4 (1, 0, 0), the basic voltage vector V5 (1, 0, 1), the basic voltage vector V1 (0, 0, 1), the zero vector V0 (0, 0, 0), and the zero vector V7 (1, 1, 1), which relate to one another on a phase plane at the time when the inverter rotation angle θ with the basic voltage vector V1 as an initial phase is near 300 degrees in generating a PWM signal using three kinds of basic voltage vectors and two kinds of zero vectors according to the second embodiment of the present invention, are shown. In FIG. 24B, as examples of a switching order of three kinds of basic voltage vectors and two kinds of zero vectors, four ways of switching orders, (a) V7, V5, V4, V0, and V1, (b) V7, V5, V4, V0, V1, and V5, (c) V7, V5, V1, V0, and V4, and (d) V7, V5, V1, V0, V4, and V5 are shown. In FIGS. 25A to 25D, logical states (switching patterns) of semiconductor switching elements on a DC bus positive pole side controlled according to the switching of four ways of three kinds of basic voltage vectors and two kinds of zero vectors shown in FIG. 24B is shown. This is set as a pattern #25.

In FIG. 26A, the basic voltage vector V5 (1, 0, 1), the basic voltage vector V1 (0, 0, 1), the basic voltage vector V3 (0, 1, 1), the zero vector V0 (0, 0, 0), and the zero vector V7 (1, 1, 1), which relate to one another on a phase plane at the time when the inverter rotation angle θ with the basic voltage vector V1 as an initial phase is near 0 degree in generating a PWM signal using three kinds of basic voltage vectors and two kinds of zero vectors according to the second embodiment of the present invention, are shown. In FIG. 26B, as examples of a switching order of three kinds of basic voltage vectors and two kinds of zero vectors, four ways of switching orders, (a) V7, V5, V0, V1, and V3, (b) V7, V5, V1, V0, V1, and V3, (c) V7, V3, V0, V1, and V5, and (d) V7, V3, V1, V0, V1, and V5 are shown. In FIGS. 27A to 27D, logical states (switching patterns) of semiconductor switching elements on a DC bus positive pole side controlled according to the switching of four ways of three kinds of basic voltage vectors and two kinds of zero vectors shown in FIG. 26B is shown. This is set as a pattern #26.

The method of generating a PWM signal using three kinds of basic voltage vectors and two kinds of zero vectors is also particularly effective when the inverter rotation angle θ is near integer times of 60 degrees (near the basic voltage vectors). Thus, it is advisable to perform switching of the respective patterns near the middle of two basic voltage vectors having a phase difference of 60 degrees as in the first embodiment.

As explained in the first embodiment, for example, a switching phase angle $\theta\alpha$ is defined as $\theta\alpha=30+60\times n$ (n: integer) and an inverter rotation angle range corresponding to the six patterns, the patterns #21 to #26, is determined as shown in FIGS. 15A and 15B. Consequently, it is possible to generate a PWM signal having a high degree of freedom of a percentage modulation, preventing excessive deterioration of efficiency, and having a noise reduction effect using three kinds of basic voltage vector and two kinds of zero vectors.

When it is desired to improve a degree of freedom of PWM signal generation in addition to such an effect, it is possible to realize this by setting the switching phase angle $\theta\alpha$ as $\theta\alpha=30\times n$ (n: integer) and switching the switching orders (the switching patterns) shown in FIGS. 16B, 18B, 20B, 22B, 24B, and 26B for each section of 30 degrees.

Specifically, the switching patterns of (c) and (d) shown in FIG. 16B are used in a section of 30 degrees to 60 degrees and the switching patterns of (a) and (b) shown in FIG. 16B are used in a section of 60 degrees to 90 degrees. Similarly, the switching patterns of (a) and (b) shown in FIG. 18B are used in a section of 90 degrees to 120 degrees and the switching patterns of (c) and (d) shown in FIG. 18B are used in a section of 120 degrees to 150 degrees. The switching patterns of (c) and (d) shown in FIG. 20B are used in a section of 150 degrees to 180 degrees and the switching patterns of (a) and (b) shown in FIG. 20B are used in a section of 180 degrees to 210 degrees. The switching patterns of (a) and (b) shown in FIG. 22B are used in a section of 210 degrees to 240 degrees and the switching patterns of (c) and (d) shown in FIG. 22B are used in a section of 240 degrees to 270 degrees. The switching patterns of (c) and (d) shown in FIG. 24B are used in a section of 270 degrees to 300 degrees and the switching patterns of (a) and (b) shown in FIG. 24B are used in a section of 300 degrees to 330 degrees. The switching patterns of (a) and (b) shown in FIG. 26B are used in a section of 330 degrees and 360 degrees and the switching patterns of (c) and (d) shown in FIG. 26B are used in a section of 0 degree to 30 degrees.

In this way, according to the second embodiment, as in the first embodiment, it is possible to generate a PWM signal having a high degree of freedom of a percentage modulation and preventing excessive deterioration of efficiency with the simple method of using three kinds of basic voltage vector having phase differences of 60 degrees and two kinds of zero vectors without adding a special device. It is also possible to generate a PWM signal also having a noise reduction effect in addition to the effect in the first embodiment.

Note that it is possible to switch and use the PWM signal generating system according to the first embodiment using one kind of a zero vector and the PWM signal generating system according to the second embodiment using two kinds of zero vectors as required. It is possible to realize this by, for example, selecting the systems for each arbitrary section of an inverter rotation angle or changing the systems at arbitrary timing at the time of generation of a PWM signal.

Third Embodiment

Figure 28A:
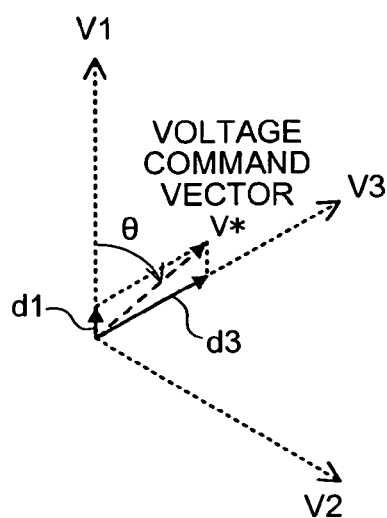
FIGS. 28A to 28C are graphs for explaining an operation of a PWM-signal creating unit in a three-phase PWM-signal generating apparatus according to a third embodiment of the present invention.
Figure 28B:
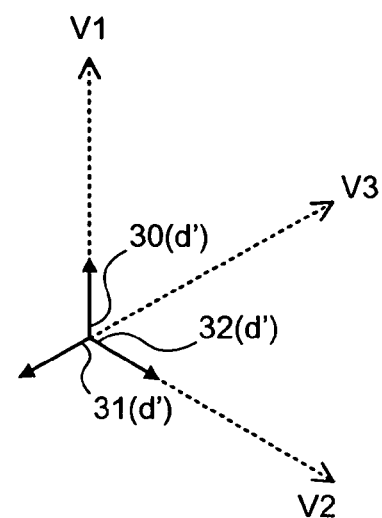
Figure 28C:
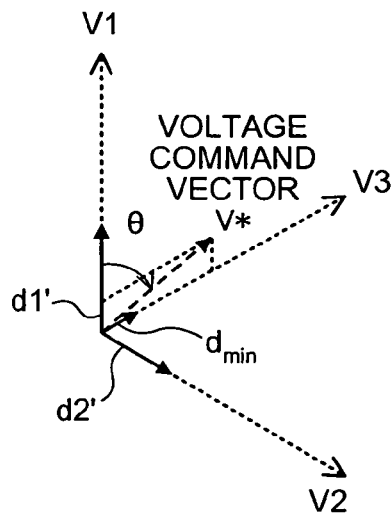

FIGS. 28A to 28C are graphs for explaining, in an inverter including a three-phase PWM-signal generating apparatus according to a third embodiment of the present invention, an operation of a PWM-signal generating unit in the three-phase PWM-signal generating apparatus. In the third embodiment, a PWM signal is generated by the same method as the first and the second embodiment. However, an example of a constitution in securing an operation range on a low speed side of a motor is shown in the third embodiment. To facilitate understanding, in the explanation of the second embodiment, a PWM signal is generated by the method according to the first embodiment.

In the third embodiment, in the PWM-signal creating unit 21 in the constitution shown in FIG. 1 (the first embodiment), the PWM-signal-duty creating unit 22 performs the same operation as the first embodiment. However, the PWM-signal-duty redistributing unit 23 performs an operation different from the operation in the first embodiment. The third embodiment is explained below with reference to FIG. 1.

To secure an operation range on a low speed side of the motor 7, it is necessary to further reduce a percentage modulation, that is, further reduce a length |V*| of the voltage command vector V*. To make such control possible, it is necessary to secure a production time ratio of a basic voltage vector for performing current detection. Originally, a production time ratio of a basic voltage vector has a minimum value that depends on a magnitude of the bus voltage Vdc and a limitation on a hardware side of the inverter main circuit 1 and the like.

Thus, since a sum of three-phase currents is zero, when this fact is utilized,.control of the motor 7 is established if current information of at least two phases is obtained. Taking notice of this, the third embodiment makes it possible to secure an operation range on the low speed side of the motor 7. Specifically, if a production time ratio, which is allocated to a voltage vector in the middle among three kinds of basic voltage vectors having phase differences of 60 degrees, is set to a predetermined value such as a minimum value, it is possible to secure production time ratios, which make it possible to detect an electric current, in two basic voltage vectors having a phase difference of 120 degrees on both sides of the voltage vector in the middle. Thus, even in such a special range, it is possible to continue to control the motor 7. Note that, when the minimum value is adopted as the predetermined value, a lower limit of a generation maintenance time of PWM depends on a semiconductor switching element or a CPU for calculating the generation maintenance time. Thus, the minimum value of the production time ratio is determined taking into account a limit of hardware.

This is explained specifically with reference to FIGS. 28A to 28C. FIG. 28A has the same content as FIG. 2A and is a diagram for explaining an operation of the PWM-signal-duty creating unit 22. FIG. 28B corresponds to FIG. 2B and is a diagram for explaining a virtual voltage vector used in the PWM-signal-duty redistributing unit 23 according to the third embodiment. FIG. 28C corresponds to FIG. 2C and is a diagram for explaining an operation of the PWM-signal-duty redistributing unit 23 according to the third embodiment.

In FIG. 28A, basic voltage vectors V3 and V2 are arranged at an interval of 60 degrees clockwise on a phase plane having a direction of the basic voltage vector V1 as an initial phase. When an inverter rotation angle θ is near 60 degrees, that is, when the voltage command vector V* is near the basic voltage vector V3 (in FIG. 2A, the voltage command vector V* is near the basic voltage vector V3). A state of generation of production time ratios in this case is shown in FIG. 28A. As shown in FIG. 28A, when the voltage command vector V* is present between the basic voltage vector V1 and the basic voltage vector V3, the PWM-signal-duty creating unit 22 decomposes the voltage command vector V* in two directions of the basic voltage vector V1 and the basic voltage vector V3 to thereby generate a production time ratio d1 of the basic voltage-vector V1 and a production time ratio d3 of the basic voltage vector V3.

In FIG. 28B, three virtual voltage vectors 30, 31, and 32 with phase differences of 120 degrees having equal production time ratios d' are superimposed on three basic voltage vectors V1, V3, and V2 shown in FIG. 28A. As shown in FIG. 28B, the virtual voltage vector 30 is in-phase with the basic voltage vector V1, the virtual voltage vector 31 is anti-phase with the basic voltage vector V3, and the virtual voltage vector 32 is in-phase with the basis voltage vector V2.

The PWM-signal-duty redistributing unit 23 according to the third embodiment superimposes three virtual voltage vectors in directions of basic voltage vectors having phase differences of 120 degrees, respectively, to add up production time ratios of both the virtual voltage vectors and the basic voltage vectors such that a direction of a basic voltage vector, which has a short production time ratio and with which current detection is difficult, is included. The minimum value dmin described above is given as a production time ratio of the basic voltage vector in the middle. In the example shown in FIG. 28A, since the basic voltage vectors V1 and V2 are two basic voltage vectors on both sides and the basic voltage vector V3 is the basic voltage vector in the middle, as shown in FIG. 28C, the PWM-signal-duty redistributing unit 23 adds up production time ratios of the basic voltage vector V1 and the basic voltage vector V2 and the virtual voltage vectors corresponding to the basic voltage vectors among the three virtual voltage vectors with the equal production time ratios d'. However, the PWM-signal-duty redistributing unit 23 gives the minimum value dmin as a production time ratio of the basic voltage vector V3 in the middle.

A relation between the minimum value dmin and the production time ratio d3 of the basic voltage vector V3 calculated in FIG. 28A is dmin=d3−d'. Therefore, the production time ratios d' of the virtual voltage vectors, that is, lengths of the virtual voltage vectors only have to be set as d'=d3−dmin to satisfy this Equation. Note that the production time ratios d1' and d2' in the directions of the basic voltage vectors V1 and V2 are d1'=d1+d' and d2'=d' as explained with reference to FIG. 2C.

However, a production time ratio given to a basic voltage vector in the middle at the time when basic voltage vectors are redistributed does not always have to be the minimum value dmin. The production time ratio only has to be set to a predetermined value according to a type of the motor 7 used and a condition on a load side. The predetermined value given as the production time ratio of the basic voltage vector in the middle may be changed according to an operation frequency or the like as required.

Figure 29A:
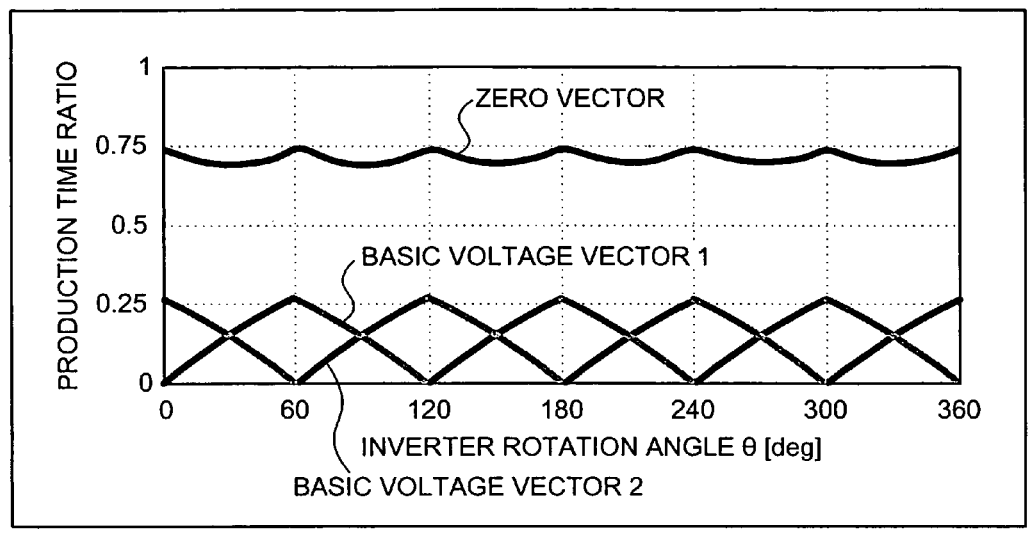
FIG. 29A is a graph of occurrence time ratios of two basic voltage vectors and a zero vector in a conventional three-phase modulation system or a two-phase modulation system.
Figure 29B:
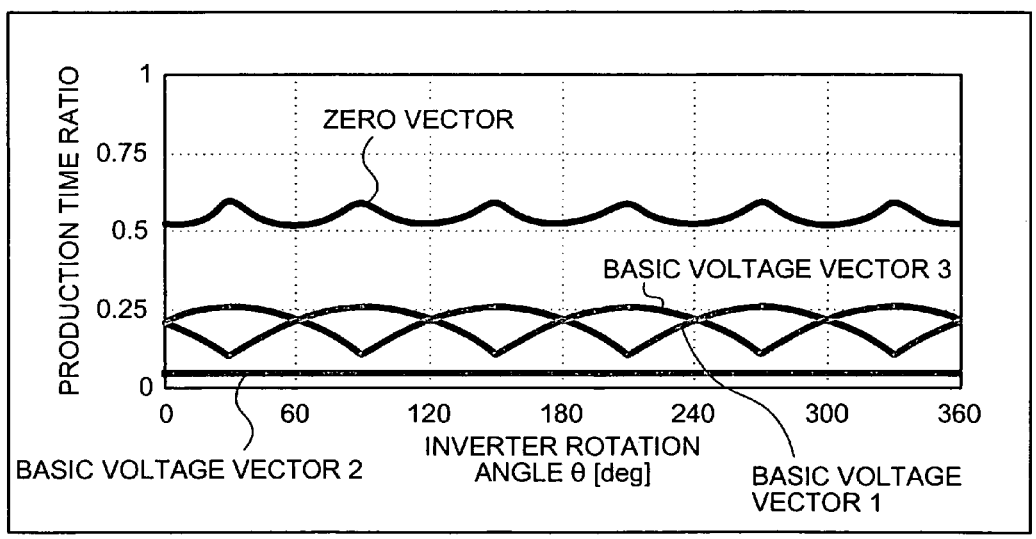
FIG. 29B is a graph of occurrence time ratios of three basic voltage vectors and a zero vector according to the third embodiment.

A production time ratio according to the third embodiment is explained in comparison with the conventional system to show that the third embodiment has an advantage. FIG. 29A is a graph of production time ratios of two kinds of basic voltage vectors and a zero vector at a percentage modulation 0.3 obtained in the conventional three-phase modulation system or two-phase modulation system. FIG. 29B is a graph of production time ratios of three kinds of basic voltage vectors and a zero vector at a percentage modulation 0.3 obtained in the third embodiment. Note that, in FIG. 29B, the minimum value dmin is set to 4%. In FIGS. 29A and 29B, basic voltage vectors are a basic voltage vector 1, a basic voltage vector 2, and a basic voltage vector 3 in an order of appearance in an inverter rotation direction.

As it can be understood from comparison of FIGS. 29A and 29B, in the method of generating a PWM signal according to the third embodiment, production time ratios of the two basic voltage vectors on both sides can be secured more regardless of an inverter rotation angle. In the conventional method shown in FIG. 29A, controllability of the motor 7 is deteriorated as a percentage modulation falls. Thus, it is also evident from the figure that the method shown in the third embodiment is effective.

The above description is about the method according to the first embodiment, that is, the method of using one kind of a zero vector. In the method according to the second embodiment, that is, the method of using two kinds of zero vectors, since a total production time ratio of the zero vectors are the same, operation performance is not affected and it is possible to generate a PWM waveform with a high vibration/noise reduction effect.

When two kinds of zero vectors are used, to secure an operation range on the low speed side of the motor 7, if it is desired to make the motor 7 controllable even if a percentage modulation is set lower, that is, if it is desired to make the motor 7 controllable even if a vector length |V*| of the voltage command vector V* is set shorter, as described above, a production time ratio only has to be set to the predetermined value (the minimum value dmin) for a vector in the middle among three kinds of basic voltage vectors having phase differences of 60 degrees. Consequently, it is possible to secure a production time ratio that makes it possible to detect an electric current with two basic voltage vectors having a phase difference of 120 degrees on both sides of the voltage command vector V*. This makes it possible to continue to control the motor 7. A production time ratio of a vector in the middle in redistributing basic voltage vectors does not always have to take the minimum value dmin and only has to be set to a predetermined value according to a type of the motor 7 used and a condition on a load side. The minimum value dmin ma be changed according to an operation frequency or the like as required.

As described above, according to the third embodiment, a length of a basic voltage vector in the middle among three kinds of basic voltage vectors having phase differences of 60 degrees is set to a predetermined value such that production time ratios of the two kinds of basic voltage vectors on both sides can be secured regardless of an inverter rotation angle. Thus, it is possible to increase an operation range on a low speed side of a motor.

Fourth Embodiment

Figure 30A:
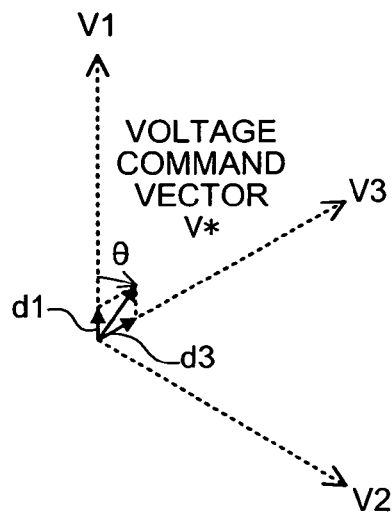
FIGS. 30A to 30C are graphs for explaining an operation of a PWM-signal creating unit in a three-phase PWM-signal generating apparatus according to a fourth embodiment of the present invention.
Figure 30B:
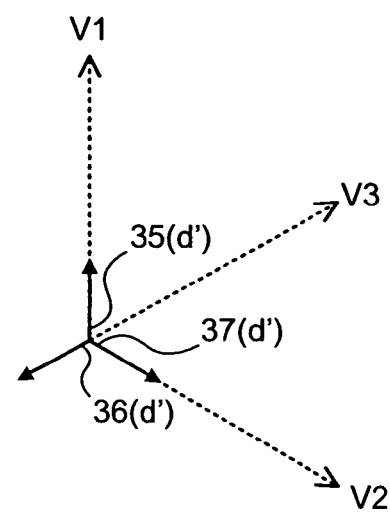
Figure 30C:
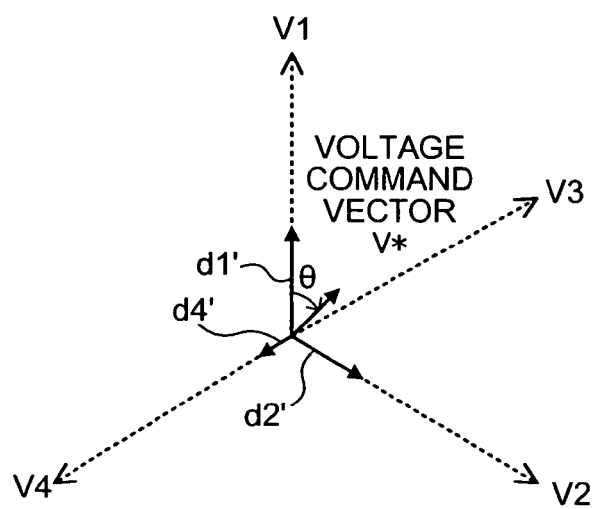

FIGS. 30A to 30C are graphs for explaining, in an inverter including a three-phase PWM-signal generating apparatus according to a fourth embodiment of the present invention, an operation of a PWM-signal generating unit in the three-phase PWM-signal generating apparatus. In the fourth embodiment, an operation request range on a low speed side is stricter than that in the third embodiment. In other words, a percentage modulation is lower than that in the third embodiment and, when a voltage command vector is decomposed into vectors in two directions, both production time ratios of the vectors in the two directions are short. An example of a constitution explained the fourth embodiment copes with this case.

According to the fourth embodiment, in the PWM-signal creating unit 21 in the constitution shown in FIG. 1 (the first embodiment), the PWM-signal-duty creating unit 22 performs the same operation as the first embodiment. However, the PWM-signal-duty redistributing unit 23 performs an operation different from the operation in the third embodiment. The fourth embodiment is explained below with reference to FIGS. 30A to 30C.

FIG. 30A has the same content as FIGS. 2A and 16A and is a diagram for explaining an operation of the PWM-signal-duty creating unit 22. FIG. 30B corresponds to FIGS. 2B and 16B and is a diagram for explaining virtual voltage vectors used in the PWM-signal-duty redistributing unit 23 according to the fourth embodiment. FIG. 30C corresponds to FIGS. 2C and 16B and is a diagram for explaining an operation of the PWM-signal-duty redistributing unit 23 according to the fourth embodiment.

In FIG. 30A, basic voltage vectors V3 and V2 are arranged at an interval of 60 degrees clockwise on a phase plane having a direction of the basic voltage vector V1 as an initial phase. When the inverter rotation angle θ is in an area of 30 to 60 degrees on the phase plane, a magnitude of the voltage command vector V* present between the basic voltage vectors V1 and V3 is short. A state of generation of production time ratios in this case is shown in FIG. 30A. In this case, as in FIGS. 2A and 16A, the PWM-signal-duty creating unit 22 decomposes the voltage command vector V* in two directions of the basic voltage vector V1 and the basic voltage vector V3 to thereby generate a production time ratio d1 of the basic voltage vector V1 and a production time ratio d3 of the basic voltage vector V3.

However, in the example shown in FIG. 30A, since both the production time ratio d1 of the basic voltage vector V1 and the production time ratio d3 of the basic voltage vector V3 are low, it is difficult to detect an electric current when the basic voltage vectors V1 and V3 are produced. Thus, as in the third embodiment, the PWM-signal-duty redistributing unit 23 carries out processing for adding virtual voltage vectors (FIGS. 30B and 30C).

In FIG. 30B, three virtual voltage vectors 35C6, and 37 with phase differences of 120 degrees having equal production time ratios d' are superimposed on three basic voltage vectors V1, V3, and V2 having phase differences of 60 degrees shown in FIG. 30A. As shown in FIG. 30B, the virtual voltage vector 35 is in-phase with the basic voltage vector V1, the virtual voltage vector 36 is anti-phase with the basic voltage vector V3, and the virtual voltage vector 37 is in-phase with the basis voltage vector V2.

In the third embodiment (FIG. 16C), the production time ratios d1', d2', and d3' of the basic voltage vectors V1, V2, and V3 are represented as d1'=d1+d', d2'=d', and d3'=d3−d'. The production time ratio d3' has positive polarity. On the other hand, in the fourth embodiment, the PWM-signal-duty redistributing unit 23 superimposes three virtual voltage vectors having the equal production time ratios d' in directions of the basic voltage vectors V1, V2, and V4 (−V3) having phase differences of 120 degrees to add up production time ratios thereof such that the production time ratio d3' has a negative polarity. Production time ratios obtained as a result of the addition are d1', d2', and d4' as shown in FIG. 30C. Production time ratios d1', d2', and d4' in this case are represented as d1'=d1+d', d2'=d', and d4'=d'−d3.

A constraint in this case is that a result of addition does not exceed a value 1. In other words, d1'+d2'+d4'≦1 is a constraint in the PWM-signal-duty redistributing unit 23. It is possible to perform vector redistribution within this range. In other words, in the control system according to the fourth embodiment, unlike the third embodiment, a production time ratio of the voltage command vector V* is redistributed to three kinds of basic voltage vectors having phase differences of 120 degrees and one kind of a zero vector.

Since a percentage modulation is a ratio of an output voltage to a bus voltage, the bus voltage increases and the percentage modulation falls as operation speed is lower and a load is lighter. Therefore, when the magnitudes d' of virtual vectors are set in the same manner as the third embodiment, polarities of the production time ratios d3' and d4' obtained in the processing for addition with the virtual vectors are decided according to a degree of lowness of the percentage modulation. Thus, it is decided which of the basic voltage vector V3 and the basic voltage vector V4 is used by monitoring the polarities of the production time ratios d3' and d4'. In other words, as a result of the monitoring, if a production time ratio in a positive value is d3', the basic voltage vector V3 is used and the control system according to the third embodiment is adopted. If a production time ratio in a positive value is d4', the basic voltage vector V4 is used and the control system according to the fourth embodiment is adopted.

In other words, it is possible to switch a control system to be adopted by managing the magnitudes d' of virtual vectors. When a low speed operation request range is not strict, even if a degree of lowness of the percentage modulation is "large", the control system according to the third embodiment is adopted. When a low speed operation request range is strict, even if a degree of lowness of the percentage modulation is "small", the control system according to the fourth embodiment is adopted.

Specifically, when a low speed operation request range is not strict, the magnitudes d' of virtual vectors are managed to set the production time ratio d3' to a positive polarity or set the production time ratio D4' to a negative polarity, that is, not to produce a basic voltage vector in the direction of the basic voltage vector V4. On the other hand, when a low speed operation request range is strict, as shown in FIG. 30C, the magnitudes d' of virtual vectors are managed to produce a basic voltage vector in the direction of the basic voltage vector V4.

A three-phase PWM signal, which is generated when the percentage modulation according to the fourth embodiment is extremely low, is explained specifically with reference to FIGS. 31A to 34B. FIGS. 31A and 31B are diagrams of a relation on a phase plane at the time when an inverter rotation angle is near 60 degrees in generating a PWM signal using three kinds of basic voltage vectors having phase differences of 120 degrees and one kind of a zero vector and an example of an order of switching of the three kinds of basic voltage vectors having phase differences of 120 degrees and the one kind of a zero vector (a pattern #31). FIGS. 32A and 32B are timing charts of a logical state (a switching pattern) of semiconductor switching elements on a DC bus positive pole side controlled according to two ways of the switching of the three kinds of basic voltage vectors having phase differences of 120 degrees and the one kind of a zero vector shown in FIG. 31B. FIGS. 33A and 33B are diagrams of a relation on a phase plane at the time when an inverter rotation angle is near 120 degrees in generating a PWM signal using three kinds of basic voltage vectors having phase differences of 120 degrees and one kind of a zero vector and an example of an order of switching of the three kinds of basic voltage vectors having phase differences of 120 degrees and the one kind of a zero vector (a pattern #32). FIGS. 34A and 34B are timing charts of a logical state (a switching pattern) of semiconductor switching elements on a DC bus positive pole side controlled according to two ways of the switching of the three kinds of basic voltage vectors having phase differences of 120 degrees and the one kind of a zero vector shown in FIG. 33B.

In FIG. 31A, the basic voltage vector V1 (0, 0, 1), the basic voltage vector V2 (0, 1, 0), the basic voltage vector V4 (1, 0, 0), and the zero vector V0 (0, 0, 0), which relate to one another when the inverter rotation angle θ is near 60 degrees (in the direction of the basic voltage vector V6) with the basic voltage vector V1 as an initial phase, are shown. In FIG. 31B, as a switching order in this case (the pattern #31), for example, two ways of switching, (a) V0, V1, V0, V2, V0, and V4 and (b) V0, V1, V0, V4, V0, and V2, are shown. Note that the switching orders (a) and (b) shown in FIG. 31B may be reversed. Specifically, in the example of the switching order (a), the switching order may be V4, V0, V2, V0, V1, and V0. FIGS. 32A and 32B show logical states (switching patterns) during one carrier control period of the semiconductor switching elements 5a, 5c, and 5e on a DC bus positive pole side in the switching orders (a) and (b) shown in FIG. 31B.

The pattern #31 described above is applied when the inverter rotation angle θ is near 100 degrees (in the direction of the basic voltage vector V2) and when the inverter rotation angle θ is near 300 degrees (in the direction of the basic voltage vector V5).

When the example of FIG. 30C is applied to FIGS. 32A and 32B, a conducting time ratio of the U-phase positive pole side switching element is d1'. A conducting time ratio of the V-phase positive pole side switching element is d2'. A conducting time ratio of the W-phase positive pole side switching element is d4'. Conducting time ratios of negative pole side switching elements in the respective phases are calculated by subtracting the conducting time ratios of the positive pole side switching elements from the value 1. Conducting times during one carrier control period of the respective switching elements are decided by multiplying these values by one carrier control period. At the time of actual PWM signal output, a PWM signal is generated taking into account a short circuit prevention time of a switching element.

In this way, the PWM-signal-duty redistributing unit 23 shown in FIG. 1 obtains the conducting times Tup, Tvp, and Twp during one carrier control period of the U-phase, V-phase, and W-phase positive pole side switching elements and the conducting times Tun, Tvn, and Twn during one carrier control period of the negative pole side switching elements. Based on the conducting times, the PWM-signal generating unit 15 emits driving signals Up, Vp, Wp, Un, Vn, and Wn to the semiconductor switching elements 5a, 5c, 5e, 5b, 5d, and 5f to make it possible to drive the motor 7.

In FIG. 33A, the basic voltage vector V3 (0, 1, 1), the basic voltage vector V6 (1, 1, 0), the basic voltage vector V5 (1, 0, 1), and the zero vector V7 (1, 1, 1), which relate to one another when the inverter rotation angle θ is near 120 degrees (in the direction of the basic voltage vector V2) with the basic voltage vector V1 as an initial phase, are shown. In FIG. 33B, as a switching order in this case (the pattern #32), for example, two ways of switching, (a) V7, V3, V7, V6, V7, and V5 and (b) V7, V3, V7, V5, V7, and V6, are shown. Note that the switching orders (a) and (b) shown in FIG. 33B may be reversed. Specifically, in the example of the switching order (a), the switching order may be V5, V7, V6, V7, V3, and V7. FIGS. 34A and 34B show logical states (switching patterns) during one carrier control period of the semiconductor switching elements 5a, 5c, and 5e on a DC bus positive pole side in the switching orders (a) and (b) shown in FIG. 33B.

Since a correspondence relation between FIGS. 33A and 33B and with FIG. 30C can be explained as described above, the correspondence relation is not described again. The pattern #32 described above is applied when the inverter rotation angle θ is near 240 degrees (in the direction of the basic voltage vector V4) and when the inverter rotation angle θ is near 0 degree (in the direction of the basic voltage vector V). In the same idea as explained in the first embodiment, it is possible to switch the method of generating a PWM signal according to the inverter rotation angle θ using the switching phase angle θα.

As described above, according to the fourth embodiment, when a voltage command vector is smaller than that in the third embodiment, a PWM signal is generated using three kinds of basic voltage vectors having phase differences of 120 degrees and one kind of a zero vector. Thus, it is possible to detect an electric current surely even when a percentage modulation is extremely low.

It is possible to switch and apply the control system according to the third embodiment and the control system according to the fourth embodiment according to whether an operation request range on a low speed side is strict. Thus, a three-phase voltage inverter more excellent in convenience of use is obtained.

In the explanation of the fourth embodiment, three kinds of basic voltage vectors having phase differences of 120 degrees and one kind of a zero vector are used. However, as in the second and the third embodiments, it is possible to generate a PWM signal in the same idea when two kinds of zero vectors are used. The method of distributing a zero vector into two is explained in the second and the third embodiment. Thus, an explanation of the method is omitted.

Fifth Embodiment

Figure 35A:
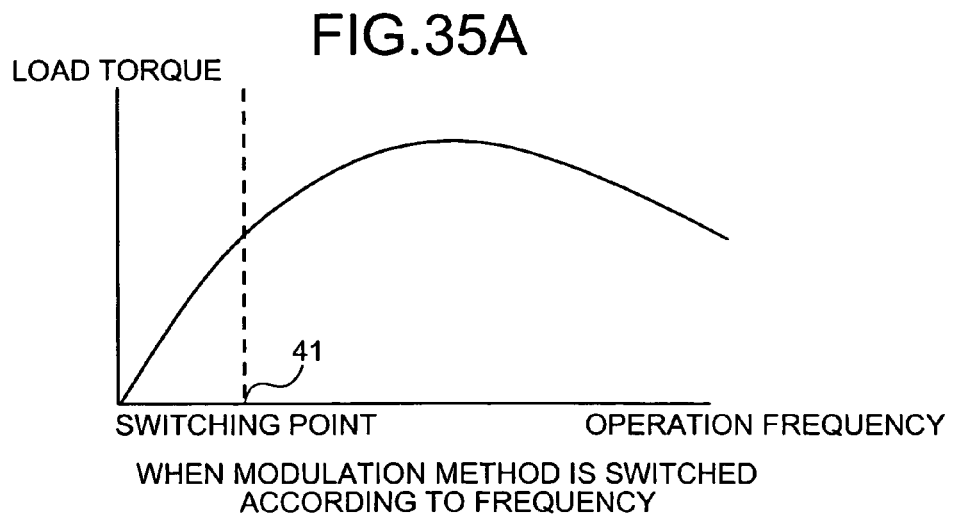
FIGS. 35A to 35C are graphs for explaining a method of constituting a PWM-signal generating unit according to a fifth embodiment of the present invention, when both the methods of generating a PWM signal according to the first to the fourth embodiments and the method of generating a PWM signal according to the conventional three-phase modulation system or two-phase modulation system are used.
Figure 35B:
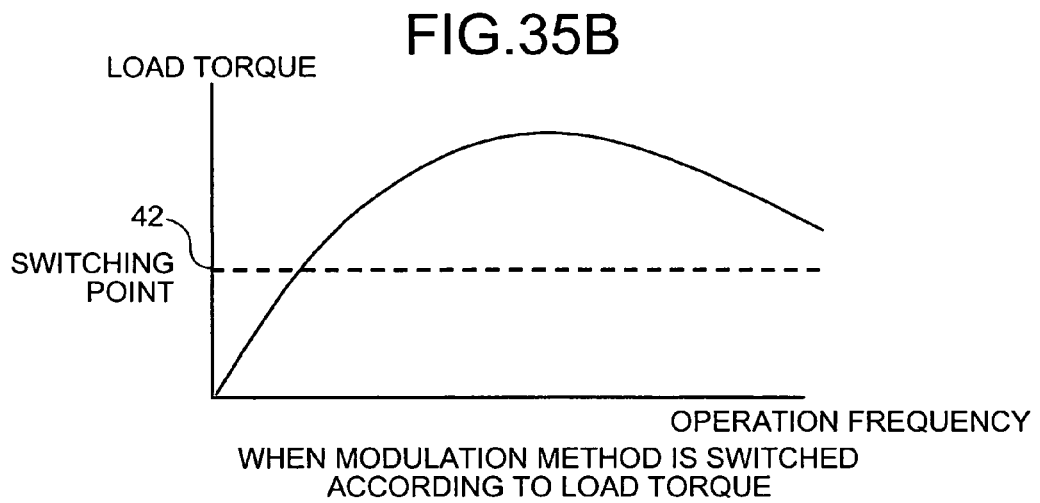
Figure 35C:
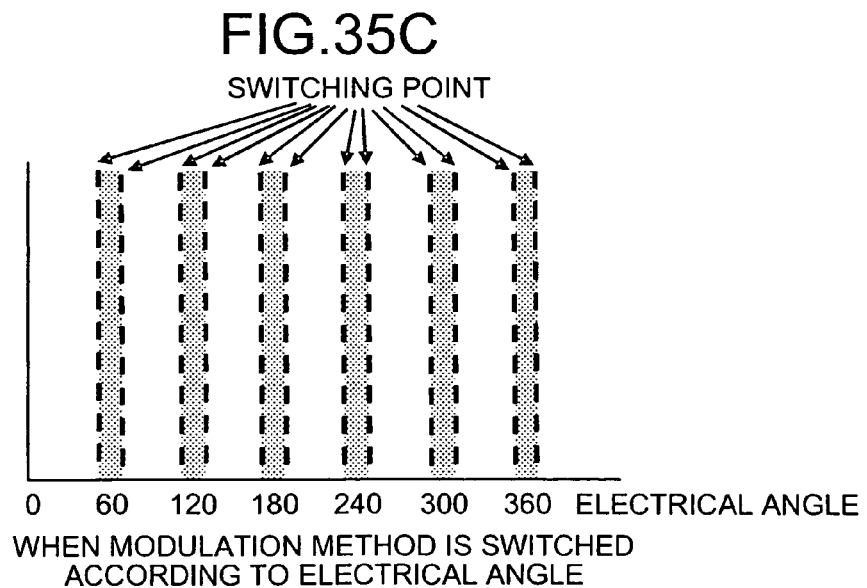

FIGS. 35A to 35C are graphs for explaining, as a fifth embodiment of the present invention, a method of constitution at the time when both the method of generating a PWM signal according to the first to the fourth embodiments explained above and the method of generating a PWM signal according to the conventional three-phase modulation system or two-phase modulation system are used. The PWM-signal creating unit 21 shown in FIG. 1 has a constitution in which the PWM-signal-duty redistributing unit 23 is added to the PWM duty producing unit 22 equivalent to the PWM-signal creating unit 14 shown in FIG. 36. Thus, it is possible to use both the methods.

As shown in FIG. 35A, in a characteristic of relation between an operation frequency and a load torque of a motor, for example, it is possible to adopt a constitution for setting a switching point 41 before shift to high speed operation, generating a PWM signal according to the first and the second embodiment with the PWM-signal creating unit 21 shown in FIG. 1 at low speed, and generating a PWM signal according to the conventional three-phase modulation system or two-phase modulation system with the PWM-signal creating unit 14 shown in FIG. 36 at high speed. When switching is performed according to an actual operation frequency, it is possible to prevent an adverse effect like hutching by giving a hysteresis characteristic to a switching frequency. Note that the operation frequency may be an actual operation frequency or may be an operation frequency command. According to this constitution, it is possible to optimize efficiency and reduce processing loads of a CPU or the like in a high speed operation area.

As shown in FIG. 35B, in a characteristic of relation between an operation frequency and a load torque of a motor, for example, it is possible to adopt a constitution for setting a switching point 42 to a predetermined value of a load torque applied to the motor indicating a high load or a predetermined value of an electric current flowing to the motor indicating a high current, generating a PWM signal according to the first and the second embodiments with the PWM-signal creating unit 21 shown in FIG. 1 when a light load or a low current is observed, and generating a PWM signal according to the conventional three-phase modulation system or two-phase modulation system with the PWM-signal creating unit 14 shown in FIG. 36 when a high load or a high current is observed. In this case, it is also possible to prevent an adverse effect like hutching by giving a hysteresis characteristic to a threshold. According to this constitution, it is possible to optimize efficiency and reduce processing loads of a CPU or the like in a high speed operation area.

In FIG. 35C, an example in which a method of generating a PWM signal is switched according to an inverter rotation angle is shown. It is possible to adopt a constitution for setting switching points in respective ranges such that a PWM signal is generated as described below. For example, when the inverter rotation angle is in ranges of 15 degrees to 45 degrees, 75 degrees to 105 degrees, 135 degrees to 165 degrees, 195 degrees to 225 degrees, 255 degrees to 285 degrees, and 315 degrees to 345 degrees on a phase plane, the PWM-signal creating unit 14 shown in FIG. 36 produces a PWM signal according to the conventional three-phase modulation system or two-phase modulation system. In the other ranges of 0 degree to 15 degrees, 45 degrees to 75 degrees, 105 degrees to 135 degrees, 165 degrees to 195 degrees, 225 degrees to 255 degrees, 285 degrees to 315 degrees, and 345 degrees to 360 degrees, the PWM-signal creating unit 21 shown in FIG. 1 generates a PWM signal in the system according to the first to the fourth embodiments. In this way, the two PWM signal generating methods are used properly when a voltage command vector is passing near directions of respective basic voltage vectors and when a voltage command vector is passing through the other areas. This makes it possible to optimize efficiency in, in particular, a low speed operation area.

Note that the switching points shown in FIG. 35C can be set as fixed values according to an inverter rotation angles. However, the switching points may be arbitrary values determined according to a short circuit prevention time of inverter switching elements, a noise generation amount depending on hardware, an AD value detection time depending on a CPU, a percentage modulation at the time of operation of a motor, or the like. It is also possible to switch the modulation methods according to an operation frequency, a magnitude of a load torque, a percentage modulation, an electrical angle, or the like. Since it is possible to optimize efficiency by using a plurality of PWM signal generating methods in combination as required, a higher vibration/noise reduction effect is obtained.

As explained above, according to the first to the fifth embodiments, a three-phase PWM signal is generated using three kinds of actual vectors and one kind or two kinds of zero vectors. Thus, even in an area where a percentage modulation is low or, for example, when an inverter rotation angle at the time when a direction of the basic voltage vector V1 is set as an initial phase is near integer times of 60 degrees or 30 degrees, it is possible to perform detection of a DC bus current accurately. In particular, it is possible to improve controllability even at the time of a low load operation and a low speed operation.

It is also possible to reduce deterioration of efficiency. It is also possible to reduce an influence on noise and vibration. It is possible to use the method in a range where a percentage modulation is high. In addition, since a PWM signal is generated based on the conventional three-phase modulation system or two-phase modulation system, an influence on a load of software is little. Thus, it is possible to switch a modulation system to the three-phase modulation system or the two-phase modulation system easily when switching of the modulation system is necessary. It is possible to improve reliability for startup. It is possible to apply the method to a three-phase induction motor or a synchronous motor.

In particular, when a three-phase PWM signal is generated using three kinds of actual vectors and two kinds of zero vectors, a noise reduction effect near a carrier frequency is obtained more easily than using three kinds of actual vectors and one kind of a zero vector.

INDUSTRIAL APPLICABILITY

As described above, the three-phase PWM-signal generating apparatus according to the present invention is useful for expanding a range of application of the three-phase voltage inverter.

The invention claimed is:

1. An apparatus for generating a three-phase pulse-width-modulation signal for a three-phase voltage inverter employing a semiconductor switching element, the apparatus comprising:
a generating unit that generates the three-phase pulse-width-modulation signal based on a combination of three basic voltage vectors and a zero vector wherein the generating unit includes
a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and
a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 60 degrees and a zero vector based on the occurrence time ratio distributed.

2. The apparatus according to claim 1, further comprising:
a switching unit that switches between a first mode and a second mode based on at least one of a load status, an operation frequency, and a range of angle of an inverter rotation angle of an electric motor that is driven by the three-phase voltage inverter, wherein
the first mode generates the three-phase pulse-width-modulation signal using the two basic voltage vectors and the at least a zero vector created by the creating unit, and
the second mode generates the three-phase pulse-width-modulation signal using the three basic voltage vectors and the zero vector created by the distributing unit.

3. An apparatus for generating a three-phase pulse-width-modulation signal for a three-phase voltage inverter employing a semiconductor switching element, the apparatus comprising:
a generating unit that generates the three-phase pulse-width-modulation signal based on a combination of three basic voltage vectors and a zero vector wherein the generating unit includes
a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and
a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 60 degrees and a zero vector based on the occurrence time ratio distributed, with an occurrence time ratio of a basic voltage vector in a middle of the three basic voltage vectors having a phase difference of 60 degrees set to a predetermined value.

4. The apparatus according to claim 3, further comprising:
a switching unit that switches between a first mode and a second mode based on at least one of a load status, an operation frequency, and a range of angle of an inverter rotation angle of an electric motor that is driven by the three-phase voltage inverter, wherein
the first mode generates the three-phase pulse-width-modulation signal using the two basic voltage vectors and the at least a zero vector created by the creating unit, and
the second mode generates the three-phase pulse-width-modulation signal using the three basic voltage vectors and the zero vector created by the distributing unit.

5. An apparatus for generating a three-phase pulse-width-modulation signal for a three-phase voltage inverter employing a semiconductor switching element, the apparatus comprising:
a generating unit that generates the three-phase pulse-width-modulation signal based on a combination of three basic voltage vectors and a zero vector wherein
the generating unit includes
a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and
a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 120 degrees and at least a zero vector based on the occurrence time ratio distributed.

6. The apparatus according to claim 5, further comprising:
a switching unit that switches between a first mode and a second mode based on at least one of a load status, an operation frequency, and a range of angle of an inverter rotation angle of an electric motor that is driven by the three-phase voltage inverter, wherein
the first mode generates the three-phase pulse-width-modulation signal using the two basic voltage vectors and the at least a zero vector created by the creating unit, and
the second mode generates the three-phase pulse-width-modulation signal using the three basic voltage vectors and the at least a zero vector created by the distributing unit.

7. An apparatus for generating a three-phase pulse-width-modulation signal for a three-phase voltage inverter employing a semiconductor switching element, the apparatus comprising;

a generating unit that generates the three-phase pulse-width-modulation signal based on a combination of three basic voltage vectors and a zero vector wherein the generating unit includes a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create, when an operation request range on a low speed side is not stringent, a first combination of three basic voltage vectors having a phase difference of 60 degrees and at least a zero vector based on the occurrence time ratio distributed, and when the operation request range on a low speed side is stringent, a second combination of three basic voltage vectors having a phase difference of 120 degrees and at least a zero vector based on the occurrence time ratio distributed.

8. The apparatus according to claim 7, further comprising:
a switching unit that switches between a first mode and a second mode based on at least one of a load status, an operation frequency, and a range of angle of an inverter rotation angle of an electric motor that is driven by the three-phase voltage inverter, wherein the first mode generates the three-phase pulse-width-modulation signal using the two basic voltage vectors and the at least a zero vector created by the creating unit, and the second mode generates the three-phase pulse-width-modulation signal using either one of the first combination and the second combination, in a switchable manner.

9. An apparatus for generating a three-phase pulse-width-modulation signal for a three-phase voltage inverter employing a semiconductor switching element, the apparatus comprising:

a generating unit that generates the three-phase pulse-width-modulation signal based on a combination of three basic voltage vectors and two zero vectors wherein the generating unit includes a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 60 degrees and two zero vectors based on the occurrence time ratio distributed.

10. The apparatus according to claim 9, further comprising:
a switching unit that switches between a first mode and a second mode based on at least one of a load status, an operation frequency, and a range of angle of an inverter rotation angle of an electric motor that is driven by the three-phase voltage inverter, wherein the first mode generates the three-phase pulse-width-modulation signal using the two basic voltage vectors and the at least a zero vector created by the creating unit, and the second mode generates the three-phase pulse-width-modulation signal using the three basic voltage vectors and the two zero vectors created by the distributing unit.

11. An apparatus for generating a three-phase pulse-width-modulation signal for a three-phase voltage inverter employing a semiconductor switching element, the apparatus comprising:

a generating unit that generates the three-phase pulse-width-modulation signal based on a combination of three basic voltage vectors and two zero vectors wherein the generating unit includes a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 60 degrees and two zero vectors based on the occurrence time ratio distributed, while changing occurrence time ratios for the two zero vectors at a predetermined rate.

12. The apparatus according to claim 11, further comprising:
a switching unit that switches between a first mode and a second mode based on at least one of a load status, an operation frequency, and a range of angle of an inverter rotation angle of an electric motor that is driven by the three-phase voltage inverter, wherein the first mode generates the three-phase pulse-width-modulation signal using the two basic voltage vectors and the at least a zero vector created by the creating unit, and the second mode generates the three-phase pulse-width-modulation signal using the three basic voltage vectors and the two zero vectors created by the distributing unit.

13. An apparatus for generating a three-phase pulse-width-modulation signal for a three-phase voltage inverter employing a semiconductor switching element, the apparatus comprising:

a generating unit that generates the three-phase pulse-width-modulation signal based on a combination of three basic voltage vectors and two zero vectors, wherein the generating unit includes a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 60 degrees and two zero vectors based on the occurrence time ratio distributed, with an occurrence time ratio of a basic voltage vector in a middle of the three basic voltage vectors having a phase difference of 60 degrees set to a predetermined value.

14. The apparatus according to claim 13, further comprising:

a switching unit that switches between a first mode and a second mode based on at least one of a load status, an operation frequency, and a range of angle of an inverter rotation angle of an electric motor that is driven by the three-phase voltage inverter, wherein the first mode generates the three-phase pulse-width-modulation signal using the two basic voltage vectors and the at least a zero vector created by the creating unit, and the second mode generates the three-phase pulse-width-modulation signal using the three basic voltage vectors and the two zero vectors created by the distributing unit.

15. An apparatus for generating a three-phase pulse-width-modulation signal for a three-phase voltage inverter employing a semiconductor switching element, the apparatus comprising:

a generating unit that generates the three-phase pulse-width-modulation signal based on a combination of three basic voltage vectors and two zero vectors, wherein the generating unit includes a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create three basic voltage vectors having a phase difference of 60 degrees and two zero vectors based on the occurrence time ratio distributed, while changing occurrence time ratios for the two zero vectors at a predetermined rate with an occurrence time ratio of a basic voltage vector in a middle of the three basic voltage vectors having a phase difference of 60 degrees set to a predetermined value.

16. The apparatus according to claim 15, further comprising:

a switching unit that switches between a first mode and a second mode based on at least one of a load status, an operation frequency, and a range of angle of an inverter rotation angle of an electric motor that is driven by the three-phase voltage inverter, wherein the first mode generates the three-phase pulse-width-modulation signal using the two basic voltage vectors and the at least a zero vector created by the creating unit, and the second mode generates the three-phase pulse-width-modulation signal using the three basic voltage vectors and the two zero vectors created by the distributing unit.

17. An apparatus for generating a three-phase pulse-width-modulation signal for a three-phase voltage inverter employing a semiconductor switching element, the apparatus comprising:

a generating unit that generates the three-phase pulse-width-modulation signal based on a combination of three basic voltage vectors and a zero vector and a combination of three basic voltage vectors and two zero vectors, wherein the generating unit includes a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create a first combination of three basic voltage vectors having a phase difference of 60 degrees and a zero vector and a second combination of three basic voltage vectors having a phase difference of 60 degrees and two zero vectors, in a switchable manner.

18. The apparatus according to claim 17, further comprising:

a switching unit that switches between a first mode and a second mode based on at least one of a load status, an operation frequency, and a range of angle of an inverter rotation angle of an electric motor that is driven by the three-phase voltage inverter, wherein the first mode generates the three-phase pulse-width-modulation signal using the two basic voltage vectors and the at least a zero vector created by the creating unit, and the second mode generates the three-phase pulse-width-modulation signal using either one of the first combination and the second combination, in a switchable manner.

19. An apparatus for generating a three-phase pulse-width-modulation signal for a three-phase voltage inverter employing a semiconductor switching element, the apparatus comprising:

a generating unit that generates the three-phase pulse-width-modulation signal based on a combination of three basic voltage vectors and a zero vector and a combination of three basic voltage vectors and two zero vectors, wherein
the generating unit includes
- a creating unit that creates two basic voltage vectors having a phase difference of 60 degrees and at least a zero vector by allocating occurrence time ratios for two basic voltage vectors having a phase difference of 60 degrees with a voltage command vector therebetween and a corresponding zero vector based on the voltage command vector; and
- a distributing unit that distributes an occurrence time ratio of the voltage command vector to three basic voltage vectors having a phase difference of 120 degrees including one of the two basic voltage vectors having a phase difference of 60 degrees, using three vectors with equal lengths having a phase difference of 120 degrees and constituting a zero vector corresponding to the voltage command vector, to create a first combination of three basic voltage vectors having a phase difference of 60 degrees and a zero vector and a second combination of three basic voltage vectors having a phase difference of 60 degrees and two zero vectors, in a switchable manner, while changing occurrence time ratios for the two zero vectors at a predetermined rate.

20. The apparatus according to claim 19, further comprising:
a switching unit that switches between a first mode and a second mode based on at least one of a load status, an operation frequency, and a range of angle of an inverter rotation angle of an electric motor that is driven by the three-phase voltage inverter, wherein
the first mode generates the three-phase pulse-width-modulation signal using the two basic voltage vectors and the at least a zero vector created by the creating unit, and the second mode generates the three-phase pulse-width-modulation signal using either one of the first combination and the second combination, in a switchable manner.

* * * * *